United States Patent
Onodera et al.

(10) Patent No.: US 10,975,200 B2
(45) Date of Patent: Apr. 13, 2021

(54) CONDUCTIVE POLYMER COMPOSITION, CONDUCTIVE-POLYMER-CONTAINING POROUS BODY AND MANUFACTURING METHOD THEREFOR, AND SOLID ELECTROLYTIC CAPACITOR AND MANUFACTURING METHOD THEREFOR

(71) Applicant: IDEMITSU KOSAN CO., LTD., Tokyo (JP)

(72) Inventors: Shingo Onodera, Chiba (JP); Toru Bando, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/080,764

(22) PCT Filed: Feb. 27, 2017

(86) PCT No.: PCT/JP2017/007319
§ 371 (c)(1),
(2) Date: Aug. 29, 2018

(87) PCT Pub. No.: WO2017/150407
PCT Pub. Date: Sep. 8, 2017

(65) Prior Publication Data
US 2019/0062501 A1 Feb. 28, 2019

(30) Foreign Application Priority Data

Feb. 29, 2016 (JP) .............................. JP2016-037858
Jun. 3, 2016 (JP) .............................. JP2016-111939

(Continued)

(51) Int. Cl.
*C08G 73/02* (2006.01)
*H01G 9/028* (2006.01)
(Continued)

(52) U.S. Cl.
CPC ....... *C08G 73/0266* (2013.01); *C08G 61/124* (2013.01); *C08G 61/126* (2013.01);
(Continued)

(58) Field of Classification Search
CPC .......... H01G 9/028; H01G 11/48; H01B 1/27; H01B 1/128
(Continued)

(56) References Cited

U.S. PATENT DOCUMENTS 6,024,772 A 2/2000 Nishiyama
8,802,761 B2 8/2014 Onodera et al.
(Continued)

FOREIGN PATENT DOCUMENTS

CN 102803388 A 11/2012
CN 103044689 A 4/2013
(Continued)

OTHER PUBLICATIONS

International Search Report PCT/JP2017/007319 dated Feb. 27, 2017.
(Continued)

*Primary Examiner* — Tri V Nguyen
(74) *Attorney, Agent, or Firm* — Millen White Zelano and Branigan, PC; John Sopp

(57) ABSTRACT

A conductive polymer composition comprising: (a) a conductive polymer; (b) a solvent; and (c) an acid or a salt.

13 Claims, 1 Drawing Sheet

(30) Foreign Application Priority Data

Jun. 3, 2016 (JP) .............................. JP2016-111945
Sep. 7, 2016 (JP) .............................. JP2016-174881

(51) Int. Cl.

| | | |
|---|---|---|
| C08L 101/12 | (2006.01) | |
| C08K 5/13 | (2006.01) | |
| H01G 9/00 | (2006.01) | |
| H01B 1/12 | (2006.01) | |
| C08K 3/22 | (2006.01) | |
| C08G 61/12 | (2006.01) | |
| C08K 5/00 | (2006.01) | |
| C08K 5/09 | (2006.01) | |
| C08K 5/521 | (2006.01) | |
| C08K 5/5333 | (2006.01) | |

(52) U.S. Cl.

CPC .............. *C08K 3/22* (2013.01); *C08K 5/005* (2013.01); *C08K 5/09* (2013.01); *C08K 5/13* (2013.01); *C08K 5/521* (2013.01); *C08K 5/5333* (2013.01); *C08L 101/12* (2013.01); *H01G 9/0036* (2013.01); *H01G 9/028* (2013.01); *H01B 1/127* (2013.01); *H01B 1/128* (2013.01)

(58) Field of Classification Search

USPC ................. 252/500, 62.2; 361/505, 503, 527
See application file for complete search history.

(56) References Cited

U.S. PATENT DOCUMENTS

| | | | |
|---|---|---|---|
| 9,384,866 B2 | 7/2016 | Jibiki et al. | |
| 2010/0238608 A1* | 9/2010 | Dreissig | ................ H01G 9/035 |
| | | | 361/505 |
| 2012/0135255 A1 | 5/2012 | Onodera et al. | |
| 2013/0100585 A1 | 4/2013 | Suzuki et al. | |
| 2014/0008582 A1* | 1/2014 | Jibiki | .................... H01B 1/128 |
| | | | 252/500 |
| 2016/0055981 A1* | 2/2016 | Tagawa | ................. H01G 9/028 |
| | | | 361/527 |

FOREIGN PATENT DOCUMENTS

| | | | | | |
|---|---|---|---|---|---|
| EP | 0825625 | A2 | 2/1998 | | |
| EP | 2441802 | A1 | 4/2012 | | |
| JP | 10-012497 | A | 1/1998 | | |
| JP | 3087654 | B2 | 9/2000 | | |
| JP | 2004253537 | A | * | 9/2004 | ............ H01G 9/028 |
| JP | 2011-192983 | A | | 9/2011 | |
| JP | 2012062462 | A | * | 3/2012 | |
| JP | 2014037504 | A | | 2/2014 | |
| JP | 2014037504 | A | | 2/2014 | |
| JP | 2014037504 | A2 | | 2/2014 | |
| JP | 2014086473 | A | * | 5/2014 | |
| TW | 201231500 | A | | 8/2012 | |
| WO | 2002037536 | A2 | | 5/2002 | |
| WO | 2010143450 | A1 | | 12/2010 | |
| WO | WO-2014163202 | A1 | * | 10/2014 | ............ H01G 9/048 |

OTHER PUBLICATIONS

Extended EP Search Report EP 17759873.7 dated Sep. 19, 2019 (pp. 1-6).

Office Action dated Jan. 16, 2020 issued in corresponding Chinese Patent Appln. No. 201780014082.7 (pp. 1-9).

Office Action dated Aug. 12, 2020 issued in corresponding Taiwan Patent Appln. No. 106106726 (pp. 1-6).

* cited by examiner

CONDUCTIVE POLYMER COMPOSITION, CONDUCTIVE-POLYMER-CONTAINING POROUS BODY AND MANUFACTURING METHOD THEREFOR, AND SOLID ELECTROLYTIC CAPACITOR AND MANUFACTURING METHOD THEREFOR

TECHNICAL FIELD

The invention relates to a conductive polymer composition, a conductive polymer-containing porous body and a production method therefor, and a solid electrolytic capacitor and a production method therefor.

BACKGROUND ART

As one of applications of a conductive polymer, a solid electrolyte for a capacitor can be given. By using a conductive polymer, it is possible to produce a capacitor having a high heat resistance and low resistance, and in recent years, such a capacitor has become popular in automotive applications.

Patent Document 1 discloses a method for forming a solid electrolyte layer in which a capacitor device is immersed in a conductive polymer solution, thereby to allow a conductive polymer to be infiltrated into the capacitor device, followed by drying, to form a solid electrolyte layer.

RELATED ART DOCUMENT

Patent Document

Patent Document 1: JP-A-2011-192983

SUMMARY OF INVENTION

However, according to the conventional method, characteristics such as electrostatic capacity and equivalent series resistance (ESR) of the obtained capacitor are still insufficient, and hence, there was room for improvement.

One object of the invention is to provide a high-performance solid electrolytic capacitor and a production method therefor.

Another object of the invention is to provide a novel conductive polymer-containing porous body and a production method therefor.

Still another object of the invention is to provide a conductive polymer composition capable of producing a high-performance solid electrolytic capacitor.

The inventors of the invention examined the cause that the capacitor properties are not sufficient. As a result, they found that, by the conventional method, a conductive polymer composition does not sufficiently penetrate into the inner part (inside) of fine pores present on the anode surface, and hence, it is difficult to form the solid electrolyte layer uniformly and densely in the inside of fine pores, and as a result, electrostatic capacity and ESR cannot be fully improved.

Based on the above-mentioned finding, the inventors of the invention made extensive studies on a method for allowing a conductive polymer solution to be sufficiently penetrated into the inside of fine pores present on the surface of an oxide of a valve metal such as alumina. As a result, the inventors have found that, by treating an oxide of a valve metal with an acid or a salt, the surface of an oxide of a valve metal is improved, and as a result, the permeability for a conductive polymer is improved, whereby a conductive polymer solution can be penetrated into the inside of the fine pores.

Further, the inventors of the invention have found that, by applying the technology to the solid electrolytic capacitor, and by treating with an acid or a salt an anode body, that is formed of a valve metal and its oxide, of the solid electrolytic capacitor, the surface of the anode body is improved, and as a result, the permeability of a conductive polymer solution is improved, a solid electrolyte layer can be formed deep inside of the fine pores, whereby the electrostatic capacity and ESR of the solid electrolytic capacitor can be improved. The invention has been made based on this finding.

Further, the inventors of the invention have found that, by adding an acid or a salt to a conductive polymer composition, permeability of the conductive polymer composition can be improved. The invention has been made based on this finding.

According to the invention, the following conductive polymer composition is provided.

"A conductive polymer composition comprising:
(a) a conductive polymer;
(b) a solvent; and
(c) an acid or a salt".

As one aspect of this composition, the following can be exemplified.

"A conductive polymer composition comprising:
(a) a conductive polymer;
(b) a solvent; and
(c) an acid that is soluble in the solvent".

According to the invention, the following method for producing a conductive polymer-containing porous body is provided:

"A method for producing a conductive polymer-containing porous body comprising the steps of:
contacting a porous body having an oxide of a valve metal with a solution of an acid or a salt; and
impregnating the porous body with a conductive polymer solution simultaneously with or after the contact".

As one embodiment of this production method, the following can be exemplified.

"A method for producing a conductive polymer-containing porous body comprising the steps of:
contacting a porous body having an oxide of a valve metal with a solution of an acid or a salt; and
impregnating the porous body with a conductive polymer solution after the contact".

According to the invention, the following conductive polymer-containing porous body is provided.

"A conductive polymer-containing porous body that is a porous body having an oxide of a valve metal and that comprises a conductive polymer, and an acid or a salt".

As one aspect of this porous body, the following can be exemplified.

"A conductive polymer-containing porous body that is a porous body comprising an oxide of a valve metal and that comprises a conductive polymer and an acid having a hydrophobic group".

According to the invention, the following method for producing a solid electrolytic capacitor is provided.

"A method for producing a solid electrolytic capacitor comprising the steps of:
contacting an anode body that a porous body is composed of a valve metal and has a surface formed of an oxide of a valve metal with a solution of an acid or a salt; and forming a solid electrolyte layer formed of a conductive polymer on the anode body by impregnating the anode body with a conductive polymer solution simultaneously with or after the contact, followed by drying".

As one aspect of this production method, the following can be exemplified.

"A method for producing a solid electrolytic capacitor in which a solid electrolyte layer comprising a conductive polymer is formed on an anode body formed of a valve metal and its oxide, which comprises the steps of:

contacting the anode body with a solution of an acid or a salt; and impregnating the anode body after the contact with a conductive polymer solution".

As another aspect of this production method, the following can be exemplified.

"A method for producing a solid electrolytic capacitor comprising a step of impregnating an anode body formed of a valve metal and its oxide with the conductive polymer composition, followed by drying, thereby to form a solid electrolyte layer formed of a conductive polymer on the anode".

According to the invention, the following solid electrolytic capacitor is provided.

"A solid electrolytic capacitor that comprises the conductive polymer-containing porous body".

"A solid electrolytic capacitor obtained by the method for producing a solid electrolytic capacitor".

According to the invention, a high-performance solid electrolytic capacitor and a production method therefor can be provided.

According to the invention, a novel conductive polymer-containing porous body and a production method therefor can be provided.

According to the invention, a conductive polymer composition capable of producing a high-performance solid electrolytic capacitor can be provided.

MODE FOR CARRYING OUT THE INVENTION

Figure 1:
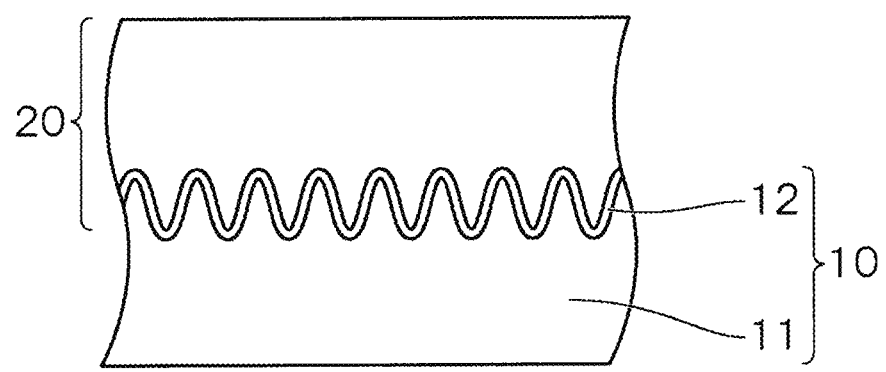
FIG. 1 is a schematic view of a conductive polymer-containing porous body (anode body and solid electrolyte layer) used in the solid electrolytic capacitor according to the invention.

[Method For Producing Conductive Polymer-Containing Porous Body]

The method for producing a conductive polymer-containing porous body according to the invention comprises the steps of:

contacting a porous body having an oxide of a valve metal with a solution of an acid or a salt; and impregnating the porous body with a conductive polymer solution simultaneously with or after the contact.

By contacting a porous body having an oxide of a valve metal with a solution of an acid or a salt, the surface quality of the porous body is improved, and the conductive polymer solution can be penetrated deep inside the fine pore. Further, as mentioned later, by applying this method to the production of the electrolytic capacitor, a solid electrolyte layer formed of a conductive polymer can be formed deep inside the fine pore of the porous body, and as a result, a solid electrolytic capacitor having excellent electrostatic capacity and ESR can be produced.

Hereinbelow, an explanation will be made on this production method.

(Step of Contacting a Solution of an Acid or a Salt With a Porous Body Having an Oxide of a Valve Metal)

In this step, a porous body having an oxide of a valve metal contacts with a solution of an acid or a salt, followed by drying of the porous body.

As the valve metal of the porous body having an oxide of a valve metal, aluminum, tantalum, niobium, titanium, hafnium, zirconium, zinc, tungsten, bismuth, antimony or the like can be given, with aluminum or tantalum being preferable. As the oxide, an oxide of these metals can be given.

As the porous body having an oxide of a valve metal, a porous body formed only of an oxide of a valve metal or a porous body in which part of the structure thereof is formed of an oxide of a valve metal can be given. In the latter case, it is preferred that an oxide of a valve metal be present on the surface of the porous body.

The porous body is a material on which fine pores are present. It is preferred that the porous body have a large number of fine pores having a diameter of about 1 nm to 10 μm on its surface.

The shape of the porous body is not particularly restricted. For example, it is a shaped body or a film (foil) and has a specific thickness.

As the porous body, a shaped body formed only of an oxide of a valve metal (for example, a spherical body formed of aluminum oxide and has fine pores (alumina ball)) can be given. In addition, a film (foil) formed of a valve metal and an oxide thereof (for example, aluminum having etching holes formed by surface roughing and aluminum oxide formed thereon) (anode material of an aluminum electrolytic capacitor) can be given.

No specific restrictions are imposed on an acid or a salt used for the contact. The acid is an arrhenius acid or Bronsted acid having an acid group ($H^+$). For example, sulfonic acid and a salt thereof, phosphoric acid and a salt thereof, a phosphoric acid ester and a salt thereof, carboxylic acid and a salt thereof, amino acid and a salt thereof, boric acid and a salt thereof, boronic acid and a salt thereof or the like can be given.

As the salt, an ammonium salt, an alkali metal salt (for example, sodium salt, lithium salt, potassium salt, etc.) of a corresponding acid can be used.

Specifically, phosphoric acid and a salt thereof; monomethyl phosphate, dimethyl phosphate, a mixture of monomethyl phosphate and dimethyl phosphate and a salt thereof; monoethyl phosphate, diethyl phosphate, a mixture of monoethyl phosphate and diethyl phosphate and a salt thereof; monoisopropyl phosphate, diisopropyl phosphate, a mixture of monoisopropyl phosphate and diisopropyl phosphate and a salt thereof; monobutyl phosphate, dibutyl phosphate, a mixture of monobutyl phosphate and dibutyl phosphate, and a salt thereof; mono(2-ethylhexyl) phosphate, di(2-ethylhexyl) phosphate, a mixture of mono(2-ethylhexyl) phosphate and di(2-ethylhexyl) phosphate and a salt thereof; acetic acid and a salt thereof; propionic acid and a salt thereof; butyric acid and a salt thereof; DL-2-methylbutyric acid and a salt thereof; 2-ethylhexanoic acid and a salt thereof; 3,5,5-trimethylhexanoic acid and a salt thereof; myristic acid and a salt thereof; 2-methylvaleric acid and a salt thereof; adipic acid and a salt thereof; glycine and a salt thereof; β alanine and a salt thereof; DL-alanine and a salt thereof; DL-valine and a salt thereof; (±)-10-camphorsulfonic acid and a salt thereof; dioctyl sulfosuccinic acid a salt thereof; 2-[4-(2-hydroxyethyl)-1-piperazinyl]ethane sulfonic acid and a salt thereof; boric acid and a boric acid salt; dodecylbenzenesulfonic acid and a dodecylbenzenesulfonic acid salt; phenylboronic acid and a phenylboronic acid salt or the like can be given.

These may be used singly or in combination of two or more.

Among these, a phosphoric acid ester and a salt thereof, carboxylic acid and a salt thereof, carboxylic acid ester and a salt thereof, amino acid and a salt thereof or the like may also be used. Meanwhile, it is possible to configure that an acid different from a heat-resistance stabilizer is used.

The concentration of a solution of an acid or a salt is normally 0.5 to 15.0 mass %, preferably 1.0 to 5.0 mass %. In accordance with the type of an acid or a salt used, the concentration is appropriately set in a range that will not dissolve an oxide of a valve metal.

The solvent for the solution is not particularly restricted as long as it dissolves an acid or a salt. For example, water, alcohol, ketone, ether or the like can be given. Alternatively, the same solvent as that for the conductive polymer solution may be used. These solvents may be used singly or in combination of two or more.

No specific restrictions are imposed on the contact method, as long as the porous body and a solution of an acid or a salt sufficiently contact. However, a method in which a porous body is immersed in a solution of an acid or a salt is preferable.

The contact (immersion) time with this solution is normally 1 to 30 minutes, preferably 1 to 10 minutes. No specific restrictions are imposed on the contact temperature, but the contact time is normally normal temperature. It is preferred that the contact be conducted under normal pressure or reduced pressure.

After the contact with a solution of an acid or a salt, normally, the porous body is dried. The drying conditions vary depending on the type of a solution of an acid or a salt or a solvent, however, no specific restrictions are imposed on the conditions under which the solvent of the solution can be removed. The drying temperature is normally 80 to 250° C., preferably 110 to 200° C., and more preferably 150 to 200° C. The drying time is normally 10 to 60 minutes, with 30 to 60 minutes being preferable.

By drying at higher temperatures, the amount of a remaining solvent, etc. is reduced, whereby permeability of a conductive polymer solution can be improved.

(Step of Impregnating Porous Body With Conductive Polymer Solution)

In this step, a porous body that was in contact with an acid or a salt or a porous body that will contact with an acid or a salt are impregnated with a conductive polymer solution. Thereafter, by normally conducting drying, a solid electrolyte layer composed of a conductive polymer is formed in the inside of the fine pores of a porous body and on the porous body, whereby a conductive polymer-containing porous body is obtained.

A conductive polymer-containing porous body is a porous body comprising a conductive polymer. Specifically, it is a porous body or the like that comprises a solid electrolyte (solid electrolyte layer) formed of a conductive polymer in the inside of fine pores or on the porous body.

As the conductive polymer-containing porous body, for example, a spherical body of aluminum oxide comprising a solid electrolyte formed of a conductive polymer (alumina ball) or an anode material (an anode body formed of a valve metal or its oxide) of an aluminum electrolyte capacitor in which a solid electrolyte (solid electrolyte layer) formed of a conductive polymer is formed can be given.

As the conductive polymer, polyaniline, polythiophene, polypyrrole and derivatives thereof can be given. They may or may not have a substituent. These may be used singly or in combination of two or more.

As the conductive polymer, polyaniline is preferable.

Polyaniline preferably has a weight-average molecular weight of 10,000 or more, more preferably 20,000 or more, further preferably 30,000 or more and 1,000,000 or less, still further preferably 40,000 or more and 1,000,000 or less, with 52,000 or more and 1,000,000 or less being particularly preferable.

For example, when it is used in a solid electrolyte layer of a solid electrolytic capacitor, in view of increasing the strength of the obtained electrolyte, in general, it is preferred that the conductive polymer have a large molecular weight. On the other hand, if the molecular weight is large, the viscosity is increased, and as a result, it becomes more difficult to allow the inside of the fine pore of the porous body to be impregnated with the conductive polymer.

According to the invention, by treating with a solution of an acid or a salt, even in the case of a highly viscous conductive polymer, it is possible to allow the inside of fine pores to be impregnated with the conductive polymer.

The molecular weight of polyaniline can be measured by the following method, for example.

0.25 g of polyaniline composite was dissolved in 5 g of toluene, 10 mL of a 1 M sodium hydroxide aqueous solution was added and stirred for 15 minutes and then filtered under suction. The obtained residue was washed three times with 10 mL of toluene, three times with 10 mL of ion exchange water, and three times with 10 mL of methanol. The obtained solid matters were dried under reduced pressure, and the molecular weight of the obtained polyaniline is measured by GPC.

The molecular weight obtained above is a polystyrene (PS) converted value.

Polyaniline may or may not necessarily have a substituent. In respect of versatility and economy, polyaniline is preferably an unsubstituted polyaniline.

As the substituent when polyaniline has a substituent, a straight-chain or branched hydrocarbon group such as a methyl group, an ethyl group, a hexyl group and an octyl group; an alkoxy group such as a methoxy group and an ethoxy group; an aryloxy group such as a phenoxy group; and a halogenated hydrocarbon group such as a trifluoromethyl group (—CF$_3$ group) or the like can be given.

A polyaniline composite in which polyaniline is doped with a proton donor is preferable.

The fact that polyaniline is doped with the proton donor can be confirmed by ultraviolet-visible-near infrared spectroscopy or X-ray photoelectron spectroscopy. The proton donor can be used without specific restrictions on chemical structure as long as it has an acidity enough to allow polyaniline to generate carriers.

Use of the polyaniline composite is preferable, since the solubility in a solvent is improved.

As the proton donor, for example, Bronsted acid or a salt thereof can be given, preferably an organic acid or a salt thereof, and further preferably a proton donor represented by the following formula (I) can be given:

$$M(XARn)m \qquad (I)$$

In the formula (I), M is a hydrogen atom, an organic free radical or an inorganic free radical.

As examples of the organic free radical, a pyridinium group, an imidazolium group, and an anilinium group can be given. As examples of the inorganic free radical, lithium, sodium, potassium, cesium, ammonium, calcium, magnesium and iron can be given.

X in the formula (I) is an anion group, a $—SO_3^-$ group, a $—PO_3^{2-}$ group, a $—PO_4(OH)^-$ group, a $—OPO_3^{2-}$ group, a $—OPO_2(OH)^-$ group, and a $—COO^-$ group can be given, for example, with a $—SO_3^-$ group being preferable.

A in the formula (I) (definition of A in M(XARn)m) is a substituted or unsubstituted hydrocarbon group.

The above-mentioned hydrocarbon group is a chain-like or cyclic saturated aliphatic hydrocarbon group, a chain-like or cyclic unsaturated aliphatic hydrocarbon group or an aromatic hydrocarbon group.

As the chain-like saturated aliphatic hydrocarbon, a straight-chain or branched alkyl group can be given. As the cyclic saturated hydrocarbon group, a cycloalkyl group such as a cyclopentyl group, a cyclohexyl group, a cycloheptyl group and a cyclooctyl group can be given. Here, the cyclic saturated aliphatic hydrocarbon group may be one in which plural cyclic saturated aliphatic hydrocarbon groups are fused. For example, a norbonyl group, an adamantyl group and a fused adamantyl group can be given. As the aromatic hydrocarbon group, a phenyl group, a naphthyl group, an anthracenyl group or the like can be given. As the chain-like unsaturated aliphatic hydrocarbon, a straight-chain or branched alkenyl group or the like can be given.

Here, a substituent when A is a substituted hydrocarbon group, an alkyl group, a cycloalkyl group, a vinyl group, an allyl group, an aryl group, an alkoxy group, a halogen group, a hydroxy group, an amino group, an imino group, a nitro group, a silyl group, an ester group or the like can be given.

R in the formula (I) is bonded with A, and is independently a substituent represented by $—H$, $—R^1$, $—OR^1$, $—COR^1$, $—COOR^1$, $—(C=O)—(COR^1)$, or $—(C=O)—(COOR^1)$, and $R^1$ is a hydrocarbon group that may have a substituent, a silyl group, an alkylsilyl group, $—(R^2O)x-R^3$ group or $—(OSiR^3{}_2)x-OR^3$ ($R^2$ is independently an alkylene group, $R^3$ is independently a hydrocarbon group and x is an integer of 1 or more).

As the hydrocarbon group represented by $R^1$, a methyl group, an ethyl group, a straight-chain or branched butyl group, a pentyl group, a hexyl group, a heptyl group, an octyl group, a nonyl group, a decyl group, a dodecyl group, a pentadecyl group, an eicosanyl group or the like can be given. The substituent of the hydrocarbon group is an alkyl group, a cycloalkyl group, a vinyl group, an allyl group, an aryl group, an alkoxy group, a halogen group, a hydroxy group, an amino group, an imino group, a nitro group or an ester group or the like. The hydrocarbon group of $R^3$ is the same as that of $R^1$.

As the alkylene group represented by $R^2$, a methylene group, an ethylene group, a propylene group or the like can be given, for example.

n in the formula (I) is an integer of 1 or more, and m in the formula (I) is valance of M/valance of X.

As the compound represented by the formula (I), dialkylbenzenesulfonic acid, dialkylnaphthalenesulfonic acid or a compound containing two or more ester bonds is preferable.

As the compound containing two or more ester bonds, sulfophthalic acid ester or a compound represented by the following formula (II) is more preferable.

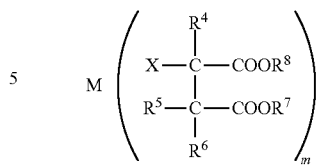

(wherein in the formula, M, X and m are the same as those in the formula (I). X is preferably a $—SO_3^-$ group).

$R^4$, $R^5$ and $R^6$ in the formula (II) are independently a hydrogen atom, a hydrocarbon group or a $R^9{}_3Si—$ group (here, $R^9$ is a hydrocarbon atom and the three $R^9$s may be the same or different).

As the hydrocarbon group when $R^4$, $R^5$ and $R^6$ are hydrocarbon groups, a straight-chain or branched alkyl group including 1 to 24 carbon atoms, an aryl group including an aromatic ring, an alkylaryl group or the like can be given.

As the hydrocarbon group of $R^9$, the same groups as those of $R^4$, $R^5$ and $R^6$ can be given.

$R^7$ and $R^8$ in the formula (II) are independently a hydrocarbon group or a $—(R^{10}O)q-R^{11}$ group [here, $R^{19}$ is a hydrocarbon group or a silylene group, $R^{11}$ is a hydrogen atom, a hydrocarbon group or a $R^{12}{}_3Si—$ (wherein $R^{12}$ is a hydrocarbon group, and the three $R^{12}$s may be the same or different), and q is an integer of 1 or more].

As the hydrocarbon group when $R^7$ and $R^8$ are hydrocarbon groups, a straight-chain or branched alkyl group including 1 to 24, preferably 4 or more carbon atoms, an aryl group including an aromatic ring, an alkylaryl group or the like can be given. As specific examples of the hydrocarbon group when $R^7$ and $R^8$ are hydrocarbon groups, a straight-chain or branched butyl group, pentyl group, hexyl group, octyl group, decyl group or the like can be given.

As the hydrocarbon group when $R^{10}$ is a hydrocarbon group in $R^7$ and $R^8$, a straight-chain or branched alkylene group including 1 to 24 carbon atoms, an arylene group including an aromatic ring, an alkylarylene group and an arylalkylene group can be given, for example. Further, as the hydrocarbon group when $R^{11}$ and $R^{12}$ are hydrocarbon atoms in $R^7$ and $R^8$, the same groups as those of $R^4$, $R^5$ and $R^6$ can be given, and q is preferably 1 to 10.

When $R^7$ and $R^8$ are a $—(R^{10}O)q-R^{11}$ group, as specific examples of the compound represented by the formula (II), two compounds represented by the following formulas can be given.

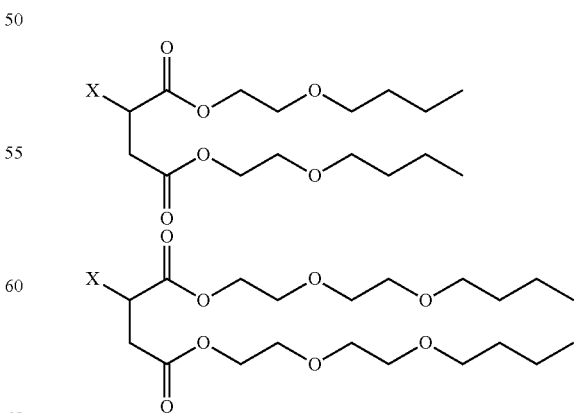

wherein X is the same as those in the formula (I).

It is further preferable that the compound represented by the above-formula (II) be a sulfosuccinic acid derivative represented by the following formula (III):

(III)

wherein in the formula, M is the same as that in the formula (I), and m' is a valence of M.

$R^{13}$ and $R^{14}$ in the formula (III) are independently a hydrocarbon group or a —$(R^{15}O)r$-$R^{16}$ group [here, $R^{15}$ is independently a hydrocarbon group or a silylene group; $R^{16}$ is a hydrogen atom, a hydrocarbon group or a $R^{17}{}_3Si$— group (here, $R^{17}$ is independently a hydrocarbon group), and r is an integer of 1 or more]

As the hydrocarbon group when $R^{13}$ and $R^{14}$ are hydrocarbon groups, the same groups as those of $R^7$ and $R^8$ can be given.

In $R^{13}$ and $R^{14}$, as the hydrocarbon group when $R^{15}$ is a hydrocarbon atom, the same group as those of $R^{1o}$ mentioned above can be given. In $R^{13}$ and $R^{14}$, as the hydrocarbon group when $R^{16}$ and $R^{17}$ are hydrocarbon groups, the same groups as those of $R^4$, $R^5$ and $R^6$ can be given.

r is preferably 1 to 10.

As specific examples when $R^{13}$ and $R^{14}$ are a —$(R^{15}O)$r-$R^{16}$ group, the same groups as those of —$(R^{10}O)q$-$R^{11}$ in $R^7$ and $R^8$ can be given.

As the hydrocarbon group of $R^{13}$ and $R^{14}$, the same groups as those of $R^7$ and $R^8$ can be given, with a butyl group, a hexyl group, a 2-hexyl group, a decyl group or the like being preferable.

By changing its structure, the above-mentioned proton donor can control the conductivity of a polyaniline composite or the solubility of a polyaniline composite in a solvent (Japan Patent No. 3384566). In the invention, according to properties required for each application, an optimum proton donor can be selected.

The doping ratio of the proton donor relative to polyaniline is preferably 0.30 or more and 0.65 or less, more preferably 0.32 or more and 0.60 or less, further preferably 0.33 or more and 0.57 or less, and particularly preferably 0.34 or more and 0.55 or less. If the doping ratio is less than 0.30, the solubility of the polyaniline composite in an organic solvent may not be increased.

The doping ratio is defined as the (number of moles of the proton donor doping the polyaniline)/(number of moles of the monomer unit of polyaniline). For example, the fact that a doping ratio of a polyaniline composite containing unsubstituted polyaniline and the proton donor is 0.5 means that one proton donor dopes relative to two monomer unit molecules of polyaniline.

The doping ratio can be calculated if the number of moles of the proton donor of the polyaniline composite and the monomer unit of the polyaniline can be measured. For example, if the proton donor is an organic sulfonic acid, the number of moles of a sulfur atom derived from the proton donor and the number of moles of a nitrogen atom derived from a monomer unit of polyaniline are quantified by the organic element analysis method, and the ratio of these values is obtained, thereby to calculate the doping ratio. However, the method of the doping ratio is not restricted to this method.

It is preferred that the polyaniline composite comprise unsubstituted polyaniline and sulfonic acid as the proton donor, and satisfy the following formula (5):

$$0.32 \leq S_5/N_5 \leq 0.60 \quad (5)$$

(wherein in the formula, $S_5$ is the total of the number of moles of a sulfur atom contained in the polyaniline composite and $N_5$ is the total of the number of moles of a nitrogen atom contained in the polyaniline composite.

Meanwhile, the number of moles of the nitrogen atom and the number of moles of the sulfur atom are values measured by an organic element analysis method, for example)

The concentration of the conductive polymer solution is normally 0.1 to 15.0 mass %, preferably 1.0 to 10.0 mass %. No specific restrictions are imposed on the solvent, as long as it can dissolve a conductive polymer. For example, aromatic hydrocarbons, aliphatic hydrocarbons, alcohols, phenols, ketones, ethers and the like can be given. They may be used singly or in combination of two or more.

The conductive polymer solution preferably further contains a phenolic compound.

The phenolic compound is not particularly limited, and is a compound represented by ArOH (wherein Ar is an aryl group or a substituted aryl group).

Specific examples include substituted phenols such as phenol, o-, m- or p-cresol, o-, m- or p-ethylphenol, o-, m- or p-propylphenol, o-, m- or p-butylphenol, o-, m- or p-chlorophenol, salicylic acid, hydroxybenzoic acid, hydroxynaphthalene and the like; polyvalent phenolic compounds such as catechol and resorcinol; and polymer compounds such as a phenol resin, polyphenol and poly(hydroxystyrene).

Further, a phenolic compound represented by the following formula (3) can be used.

(3)

wherein in the formula, n is an integer of 1 to 5; and

R is independently an alkyl group including 2 to 10 carbon atoms, an alkenyl group including 2 to 20 carbon atoms, an alkylthio group including 1 to 20 carbon atoms, a cycloalkyl group including 3 to 10 carbon atoms, an aryl group including 6 to 20 carbon atoms, an alkylaryl group including 7 to 20 carbon atoms or an arylalkyl group including 7 to 20 carbon atoms.

The R mentioned above will be explained as follows:

Examples of the alkyl group include methyl, ethyl, propyl, isopropyl, butyl, isobutyl, tertiary butyl, tertiary amyl and the like.

As the alkenyl group, a substituent having an unsaturated bond in the molecule of the above-mentioned alkyl group can be mentioned.

As the cycloalkyl group, cyclopentane, cyclohexane or the like can be given.

As the alkylthio group, methylthio, ethylthio or the like can be given.

As the aryl group, phenyl, naphthyl or the like can be given.

Examples of the alkylaryl group and the arylalkyl group include a substituent or the like obtained by combining the above-mentioned alkyl group and aryl group.

Among these groups, as R, a methyl or ethyl group is preferable.

The content of the phenolic compound is preferably from 10 to 5,000 parts by mass, more preferably from 10 to 2,000 parts by mass, per 100 parts by mass of the polyaniline composite. Use of the phenolic compound is preferred because it improves conductivity and solubility in alcohol.

The conductive polymer solution may contain an acidic substance or a salt of an acidic substance as a heat-resistance stabilizer. The acidic substance may be either an organic acid (an acid of an organic compound) containing one or more sulfonic acid group or an inorganic acid (an acid of an inorganic compound).

The acidic substance may be either an organic acid which is an acid of an organic compound or an inorganic acid which is an acid of an inorganic compound, preferably an organic acid.

The acidic substance is preferably an organic acid containing one or more sulfonic acid groups.

The organic acid having a sulfonic acid group is preferably cyclic, chain-like or branched alkylsulfonic acid, substituted or unsubstituted aromatic sulfonic acid, or polysulfonic acid having one or more sulfonic acid groups.

Examples of the alkylsulfonic acid include methanesulfonic acid, ethanesulfonic acid, di-2-ethylhexylsulfosuccinic acid. Here, the alkyl group is preferably a straight-chain or branched alkyl group including 1 to 18 carbon atoms.

Examples of the aromatic sulfonic acid include those including 6 to 20 carbon atoms, such as sulfonic acid having a benzene ring, sulfonic acid having a naphthalene skeleton, and sulfonic acid having an anthracene skeleton. Examples of the aromatic sulfonic acid include substituted or unsubstituted benzenesulfonic acid, naphthalenesulfonic acid and anthracenesulfonic acid.

Examples of the substituent are selected from the group consisting of an alkyl group (for example, one including 1 to 20 carbon atoms), an alkoxy group (for example, one including 1 to 20 carbon atoms), a hydroxy group, a nitro group, a carboxy group, and an acyl group, and the number of the substituent may be one or more. For example, naphthalenesulfonic acid, dodecylbenzenesulfonic acid, anthraquinonesulfonic acid can be mentioned. As the aromatic sulfonic acid, a substituted or unsubstituted naphthalenesulfonic acid is preferable.

The content of the heat-resistance stabilizer is preferably 0.1 to 1000 parts by mass, and more preferably 1 to 100 parts by mass relative to 100 parts by mass of the polyaniline composite. Use of a heat-resistance stabilizer is preferable because it improves heat resistance.

The solvent is not particularly limited as long as it dissolves the conductive polymer, but an organic solvent is preferable.

The organic solvent may be a water-soluble organic solvent or an organic solvent (water-immiscible organic solvent) that is substantially immiscible with water.

The water-soluble organic solvent may be a protic polar solvent or an aprotic polar solvent, and examples thereof include isopropyl alcohol, 1-butanol, 2-butanol, 2-pentanol, benzyl alcohol, alkoxy alcohol (such as 1-methoxy-2-propanol, 3-methoxy-1-butanol), ketones such as acetone; ethers such as tetrahydrofuran, dioxane and ethylene glycol mono-tert-butyl ether; and aprotic polar solvents such as N-methylpyrrolidone.

Examples of the water-immiscible organic solvents include hydrocarbon solvents such as hexane, benzene, toluene, xylene, ethylbenzene and tetralin; halogen-containing solvents such as methylene chloride, chloroform, carbon tetrachloride, dichloroethane and tetrachloroethane; ketone-based solvents such as methyl isobutyl ketone, methyl ethyl ketone, cyclopentanone, cyclohexanone or the like; ether solvents such as cyclopentyl methyl ether and the like. As the hydrocarbon solvent, an isoparaffin-based solvent containing one or two or more isoparaffins may be used.

Among them, toluene, xylene, methyl isobutyl ketone, chloroform, trichloroethane and ethyl acetate are preferable from the viewpoint of excellent solubility of the conductive polymer.

The polyaniline composite can be dissolved even if the solvent is an alcohol such as isopropyl alcohol, 1-butanol, 2-butanol, 2-pentanol, benzyl alcohol, alkoxy alcohol and the like. Alcohol is preferable from the viewpoint of reducing the environmental load as compared with aromatic compounds such as toluene.

In the case of using an organic solvent as a solvent, by using a mixed organic solvent in which a water-immiscible organic solvent and a water-soluble organic solvent are mixed at a ratio of 99 to 1:1 to 99 (mass ratio), generation of a gel or the like upon storage can be prevented and can be stored for a long period of time.

A low polar organic solvent can be used as the water-immiscible organic solvent of the mixed organic solvent. As the low polar organic solvent, hydrocarbon-based solvents such as hexane and toluene; a halogen-containing solvent such as chloroform; an isoparaffin-based solvent are preferable.

As the water-soluble organic solvent of the mixed organic solvent, a highly polar organic solvent can be used. For example, alcohols such as methanol, ethanol, isopropyl alcohol, 2-methoxyethanol, 2-ethoxyethanol, 1-methoxy-2-propanol, and 3-methoxy-1-butanol; ketones such as acetone, methyl ethyl ketone and methyl isobutyl ketone; and ethers such as tetrahydrofuran, diethyl ether and ethylene glycol mono-tert-butyl ether are preferable.

The mixed organic solvent may contain one or two or more water-immiscible organic solvents, and may contain one or two or more water-soluble organic solvents.

The method of impregnating the conductive polymer solution is not particularly limited as long as it is a method capable of sufficiently allowing the pores of the porous body to be impregnated with the conductive polymer, but a method in which the porous body is immersed in the conductive polymer solution is preferable. The impregnation (immersion) time is usually 1 to 30 minutes, preferably 1 to 10 minutes.

The drying temperature of the conductive polymer solution is usually from 30 to 200° C., preferably from 100 to 180° C. The drying time is normally 10 to 120 minutes, preferably 30 to 90 minutes.

The impregnation step and the drying step of the conductive polymer solution may be repeated. For example, it may be repeated 2 to 10 times.

[Conductive Polymer-Containing Porous Body]

The conductive polymer-containing porous body of the invention is a porous body having an oxide of a valve metal, and comprises a conductive polymer and an acid or a salt. The conductive polymer-containing porous body of the invention can be obtained by the above-mentioned method. The porous body, conductive polymer, acid or salt are as mentioned above.

[Conductive Polymer Composition]

The conductive polymer composition of the invention comprises the following components (a), (b) and (c).
(a) Conductive polymer
(b) Solvent
(c) Acid or salt As mentioned above, the conductive polymer-containing porous body is produced by contacting the porous body with an acid or a salt, thereby allowing the porous body to be impregnated with the conductive polymer solution. By impregnating the porous body with the above-mentioned conductive polymer composition, contact of an acid or a salt and impregnation of the conductive polymer solution can be conducted simultaneously. Meanwhile, the porous body may contact with a solution of an acid or a salt in advance, and then may be impregnated with the conductive polymer composition containing an acid or a salt, again.

By using such conductive polymer composition, it is possible to allow the conductive polymer to be penetrated into an object only by a simple step in which the object is impregnated with the composition.

Hereinbelow, each component will be explained.

((a) Conductive Polymer)

The conductive polymer is as mentioned above.

The concentration of the component (a) is normally 0.3 to 20 mass %, preferably 0.5 to 20 mass %, more preferably 1 to 15 mass %, and further preferably 1 to 10 mass % based on the conductive polymer composition.

((b) Solvent)

As for the solvent (b), as a solvent that dissolves the conductive polymer (a), those mentioned above can be used. However, the components (c) to (e) mentioned later are not included.

The content of the component (b) is not restricted since it can be appropriately adjusted in accordance with the amount of other components. For example, the content is 200 to 20,000 parts by mass, 300 to 17,000 parts by mass or 500 to 12,000 parts by mass, relative to 100 parts by mass of the component (a).

((c) Acid or Salt)

As the component (c), an acid or a salt mentioned above can be used. However, the component (c) does not include the components (d) and (e) mentioned below.

By using an acid soluble in the solvent (b) as the component (c), the component (c) can contact with the porous body more easily.

It is preferred that the component (c) have a solubility parameter (SP value) of 13.0 $(cal/cm^3)^{1/2}$ or less, more preferably 11.0 $(cal/cm^3)^{1/2}$ or less. It may be 10.0 $(cal/cm^3)^{1/2}$ or less. The SP value is normally 0 $(cal/cm^3)^{1/2}$ or more.

The SP value is calculated by the Fedors method described in "Polymer Engineering & Science", 1974, Vol. 14, pp 147-154. Specifically, it is as described in the Examples.

Component (c) is preferably an acid having a hydrophobic group.

Examples of the hydrophobic group include a straight-chain alkyl group, a branched-chain alkyl group, an alkylphenyl group, an alkylnaphthyl group and the like. The number of carbon atoms contained in the straight-chain alkyl group, the alkyl group of the branched alkyl group, and the alkyl group contained in the alkylphenyl group and the alkylnaphthyl group is preferably 2 to 20.

Examples of the component (c) include alkyl carboxylic acids, phosphoric acid monoesters, phosphoric acid diesters, alkylbenzene carboxylic acids, alkylbenzene phosphonic acids or the like. Meanwhile, alkylbenzene carboxylic acid is a compound represented by R-Ph-COOH, and alkylbenzene phosphonic acid is a compound represented by R-Ph-PO(OH)$_2$ (wherein R is an alkyl group, and Ph is a phenyl group).

The alkyl group of the alkyl carboxylic acid, alkyl benzene carboxylic acid and alkyl benzene phosphonic acid preferably includes 2 to 20 carbon atoms. Phosphoric acid monoesters and phosphoric acid diesters are preferably esters derived from phosphoric acid and alcohols including 2 to 20 carbon atoms.

Specific examples of the component (c) include propionic acid, DL-2-methylbutyric acid, 2-methylvaleric acid, 2-ethylhexanoic acid, 3,5,5-trimethylhexanoic acid, myristic acid, monomethyl phosphate, dimethyl phosphate, monomethyl phosphate, a mixture of monomethyl phosphate and dimethyl phosphate, diethyl phosphate, a mixture of monoethyl phosphate and diethyl phosphate, monoethyl phosphate, diethyl phosphate, a mixture of monoethyl phosphate and diethyl phosphate, a mixture of monoethyl phosphate and diethyl phosphate, monoisopropyl phosphate, diisopropyl phosphate, a mixture of monoethyl phosphate and diethyl phosphate, monoisopropyl phosphate, diisopropyl phosphate, a mixture of monoisopropyl phosphate and diisopropyl phosphate, monobutyl phosphate, dibutyl phosphate, a mixture of monobutyl phosphate and dibutyl phosphate, mono(2-ethylhexyl)phosphate, di(2-ethylhexyl)phosphate, a mixture of mono(2-ethylhexyl)phosphate and di(2-ethylhexyl)phosphate or the like.

The content of the component (c) is preferably from 0.1 to 70 mass %, more preferably from 0.5 to 70 mass %, further preferably 1 to 30 mass %, still further preferably 2 to 20 mass % based on the conductive polymer composition of the invention.

The content of component (c) may be, for example, from 20 to 200 parts by mass and from 25 to 150 parts by mass based on 100 parts by mass of component (a). It may be 200 to 900 parts by mass and 400 to 800 parts by mass based on 100 parts by mass of the component (a). It may be more than 1000 parts by mass, for example, 1100 to 7,000 parts by mass, 1200 to 3,000 parts by mass, based on 100 parts by mass of the component (a).

The conductive polymer composition of the invention may further comprise a heat-resistance stabilizer (d) and/or a phenolic compound (e) in addition to the components (a) to (c) mentioned above.

((d) Heat-Resistance Stabilizer)

As the heat-resistance stabilizer for the component (d), the heat-resistance stabilizer mentioned above can be used. However, the component (d) does not comprise the component (e). The heat-resistance stabilizer is preferably substituted or unsubstituted naphthalene sulfonic acid.

The content of the component (d) is preferably 0.1 to 70 parts by mass, more preferably 1 to 55 parts by mass, further preferably 3 to 30 parts by mass, and particularly preferably 5 to 10 parts by mass relative to 100 parts by mass of the component (a).

((e) Phenolic Compound)

As the phenolic compound as the component (e), the above-mentioned phenolic compound can be used. The component (e) is a component different from the components (b) to (d).

The content of the phenolic compound is preferably from 10 to 5,000 parts by mass, more preferably from 100 to 4,000 parts by mass, per 100 parts by mass of the component (a). Use of the component (e) is preferred because it improves conductivity and solubility in alcohol.

Further, the phenolic compound (e) may be mixed with the component (b) and used as a mixed solvent.

The conductive polymer composition of the invention may consist essentially of components (a), (b) and (c), and optionally one or more components selected from the group consisting of (d) and (e). In this case, inevitable impurities may be contained. For example, 70 mass % or more, 80 mass % or more, 90 mass % or more, 98 mass % or more, 99 mass % or more and 99.5 mass % or more of the conductive polymer composition of the invention may be components (a), (b) and (c), and optionally one or more components selected from the group consisting of (d) and (e). In addition, the conductive polymer composition of the invention may consist of components (a), (b) and (c), and optionally one or more components selected from the group consisting of (d) and (e).

[Method For Producing Solid Electrolytic Capacitor]

The method for producing a solid electrolytic capacitor according to the invention comprises the steps of:

contacting an anode body that is a porous body composed of a valve metal and has a surface formed of an oxide of a valve metal with a solution of an acid or a salt; and forming a solid electrolyte layer formed of a conductive polymer on the anode body by impregnating the anode body with a conductive polymer solution simultaneously with or after the contact, followed by drying.

The anode body means a film (foil) formed of a valve metal (anode) and an oxide (dielectric) of a valve metal formed on its surface.

A common method for forming a solid electrolytic capacitor also comprises a step of roughing the surface of the anode metal (valve metal), a step of forming a dielectric film (film of an oxide of a valve metal) on the surface of the roughened anode metal, and a step of forming a solid electrolyte layer. Further, it comprises a step of forming a cathode such that it opposes to the anode with the solid electrolyte layer being disposed therebetween.

All of the above-mentioned steps may be conducted consistently. Alternatively, as for a ready-made product in which the corresponding cathode and anode are formed (the anode body is already roughened and dried), a step of impregnating the conductive polymer composition may be conducted.

In the production method of the invention, by impregnating the anode body with the above-mentioned conductive polymer composition, contact of an acid or a salt and impregnation of the conductive polymer solution can be conducted simultaneously. Further, the anode body contacts with a solution of an acid or a salt in advance, and thereafter, the anode body is impregnated again with the conductive polymer composition containing an acid or a salt.

FIG. 1 shows a schematic view of the anode body and the solid electrolyte layer of the invention. An anode body 10 is a porous body having fine pores (large number of pores) on its surface. The anode body 10 is formed of a valve metal 11, and the surface is formed of an oxide 12 of the valve metal. In this way, the solid electrolyte layer 20 is formed on the anode body 10 having an uneven surface. In the invention, since the solid electrolyte layer 20 is entered deep inside of the anode body 10, the capacity of the capacitor comprising the solid electrolyte layer 20 is increased.

Hereinbelow, an explanation will be made on the production method.

(Step of Roughing the Surface of Anode Metal)

In this step, the surface of the anode metal (valve metal) of the solid electrolytic capacitor is roughened (etched) to enlarge the effective surface area. Alternatively, by sintering fine powder of the anode metal (valve metal), a porous body in which the effective surface area is enlarged is obtained.

As the anode metal, a valve metal such as aluminum, tantalum, niobium, titanium, hafnium, zirconium, zinc, tungsten, bismuth, antimony and the like, with aluminum or tantalum being preferable.

The surface roughening (etching) can be carried out by a known method. For example, a method of immersing in a hydrochloric acid solution (chemical etching), a method of electrolyzing aluminum as an anode in an aqueous hydrochloric acid solution (electrochemical etching) or the like can be used.

(Step of Forming Dielectric Film on the Surface of Anode Metal)

In this step, an oxide film of a dielectric is formed on the roughened anode surface. This step is normally conducted by conducting anodization by applying a voltage in an electrolyte (chemical synthesis). As a result, a film composed of an oxide (dielectric) of an anode metal is formed, whereby an anode body composed of a valve metal and its oxide is obtained.

As the electrolyte used, adipic acid, citric acid, phosphoric acid, salts thereof or the like can be given. Anodization can be conducted by a known method.

(Step of Forming Capacitor Device)

Normally, after conducting the above-mentioned anodization, a capacitor device is formed by using an anode electrode (anode body composed of a valve metal and its oxide) and a cathode electrode. The device shape is not particularly restricted, and a wound-type device or a stacked-type device can be given, for example.

In the case of a wound-type device, by winding the anode electrode and the cathode electrode through a separator, a capacitor device is formed. In the case of a stacked-type device, plural anode electrodes and plural cathode electrodes are alternatively stacked to form a capacitor device.

Formation of the capacitor device in this step can be conducted by a known method.

(Step of Contacting Anode Body With Solution of Acid or Salt)

In this step, an anode body composed of a valve metal and its oxide contacts with a solution of an acid or a salt.

The contact method is not particularly restricted, as long as it is a method in which the anode body is brought into contact with a solution of an acid or a salt. However, a method in which a capacitor device itself is immersed in a solution of an acid or a salt is preferable.

The solution of an acid or a salt is the same as mentioned above. The contact (immersion) time is normally 30 seconds to 30 minutes, preferably 1 minute to 10 minutes.

The drying conditions after the contact are the same as those mentioned above.

By drying at a higher temperature, the residual amount of the solvent or the like is reduced, and the permeability of the conductive polymer solution is improved, whereby the performance of the obtained solid electrolytic capacitor can be improved. In addition, sufficient capacitor characteristics can be obtained even with a small number of times of immersion times, so that the number of times of immersion in the conductive polymer solution can be reduced. Furthermore, it is also possible to reduce the concentration of the conductive polymer solution, thus leading to reduction in cost.

(Step of Immersing Anode Body in Conductive Polymer Solution and Drying)

In this step, an anode body treated by using a solution of an acid or a salt is immersed in a conductive polymer solution, followed by drying, whereby a solid electrolyte layer formed of a conductive polymer is formed in the inside or on the surface of the anode body.

The method for immersing the anode body in a conductive polymer solution is not particularly restricted as long as it is a method in which the inside of the anode body is sufficiently impregnated with a conductive polymer. A method in which a capacitor device itself is immersed in a conductive polymer solution is preferable. The immersion time is normally 1 to 30 minutes, preferably 1 to 10 minutes.

The conductive polymer solution is the same as that mentioned above.

The drying temperature is usually from 30 to 200° C., preferably from 100 to 180° C. The drying time is normally 10 to 120 minutes, preferably 30 to 90 minutes.

The impregnation step and the drying step of the conductive polymer solution may be repeated. For example, it may be repeated 2 to 10 times, for example.

This step is normally conducted immediately after the step of contacting with a solution of an acid or a salt. That is, after this treatment, the anode body is immersed in a conductive polymer solution without conducting application of a voltage or the like.

[Solid Electrolytic Capacitor]

The solid electrolytic capacitor of the invention comprises the above-mentioned conductive polymer-containing porous body. Specifically, it comprises an anode material (an anode body composed of a valve metal and its oxide) that comprises a solid electrolyte (solid electrolyte layer) composed of a conductive polymer.

The solid electrolytic capacitor can be obtained by the above-mentioned method for producing a solid electrolytic capacitor mentioned above.

The solid electrolytic capacitor of the invention can be used as a circuit device mounted on an electric/electronic circuit board, in particular, as a circuit device mounted on an automobile or the like.

EXAMPLES

[Production of Polyaniline Composite]

Production Example 1

A solution obtained by dissolving 37.8 g of Aerosol OT (diisooctyl sodium sulfosuccinate) and 1.47 g of Sorbon T-20 (manufactured by Toho Chemical Industry Co., Ltd.), which is a non-ionic emulsifier having a polyoxyethylene sorbitan fatty acid ester structure, in 600 mL of toluene was put into a 6L-separable flask in the stream of nitrogen. Then, 22.2 g of aniline was added to this solution. Thereafter, 1800 mL of 1M phosphoric acid was added to this solution, and the temperature of the solution having two liquid phases, i.e. toluene and water, was lowered to 5° C.

When the internal temperature of the solution reached 5° C., stirring was conducted at 390 rpm. Then, a solution obtained by dissolving 65.7 g of ammonium persulfate in 600 mL of 1M phosphoric acid was added dropwise over 2 hours by means of a dropping funnel. For 18 hours after the start of the dropwise addition, the reaction was conducted while keeping the internal temperature of the solution at 5° C. Then, the reaction temperature was elevated to 40° C., and the reaction was continued for 1 hour. Then, the reaction solution was allowed to stand and the solution was separated into two phases, and an aqueous phase was removed. 1500 mL of toluene was added to an organic phase, and the resulting mixture was washed once with 600 mL of 1M phosphoric acid and three times with 600 mL of ion exchange water, whereby a toluene solution of a polyaniline composite (protonated polyaniline) was obtained.

A slight amount of impurities contained in the resulting toluene solution of a polyaniline composite was removed by means of filter paper of #5C, whereby a toluene solution of a polyaniline composite was collected. The solution was then transferred to an evaporator, and heated in a hot water bath of 60° C. By reducing the pressure, volatile matters were distilled off by evaporation, whereby 43.0 g of a polyaniline composite was obtained (hereinafter referred to as the "polyaniline composite 1").

The chlorine content of the thus prepared polyaniline composite 1 was measured by the organochlorine content-coulometric titration method. It was confirmed that the chlorine content was less than 5 wt ppm.

0.25 g of the resulting polyaniline composite 1 was dissolved in 4.75 g of toluene and 0.25 g of isopropyl alcohol. To the resulting solution, 10 mL of a 1M aqueous sodium hydroxide solution was added, and the mixture solution was stirred for 15 minutes. Thereafter, the total amount was subjected to suction filtration by means of No. 4 filter paper, and the residues were washed three times with 10 mL of toluene, three times with 10 mL of ion exchange water and three times with 10 mL of methanol. By subjecting the resulting solid matters to drying under reduced pressure, polyaniline for measuring the molecular weight was obtained.

To 2 mg of polyaniline for measuring the molecular weight, 10 mL of 0.01 M LiBr-containing NMP was added, and dissolved by means of a shaker. Then, the solution was filtered by means of a chromatodisc (aqueous-base/non-aqueous base, 0.45μ) manufactured by GL Science Inc, and the molecular weight distribution was measured by means of GPC (gel permeation chromatography).

The measurement by means of GPC (gel permeation chromatography) was conducted by means of GPC columns manufactured by Showa Denko (Shodex KF-806M×2, Shodex KF-803×1). The measurement conditions are as follows:
Solvent: 0.01 M LiBr-containing NMP
Flow rate: 0.40 ml/min
Column temperature: 60° C.
Injection amount: 100 μL
UV detection wavelength: 270 nm
The molecular weight distribution was measured in terms of polystyrene.

The weight-average molecular weight and the molecular weight distribution were found to be 68700 and 2.9, respectively.

The doping ratio of the polyaniline composite 1 was 0.36.

[Preparation of Polyaniline Composite Solution]

Production Example 2

38 g of isopropyl alcohol, 38 g of p-tert-amylphenol and 24 g of hexane were mixed with stirring until the mixture became homogeneous. Thereafter, to 99 g of this mixed solvent, 1 g of the polyaniline composite 1 obtained in Production Example 1 was added, and dissolved homogeneously. Further, to this solution, 0.084 g of 2-naphthalene-sulfonic acid hydrate was added, dissolved homogeneously, whereby a 1 mass % polyaniline composite solution (conductive polymer solution) was prepared.

Production Example 3

38 g of isopropyl alcohol, 38 g of p-tert-amylphenol and 24 g of hexane were mixed with stirring until the mixture became homogeneous. Thereafter, to 90 g of this mixed solvent, 10 g of the polyaniline composite 1 obtained in Production Example 1 was added, and dissolved homogeneously. Further, to this solution, 0.84 g of 2-naphthalenesulfonic acid hydrate was added, dissolved homogeneously, whereby a 10 mass % polyaniline composite solution (conductive polymer solution) was prepared.

Production Example 4

38 g of isopropyl alcohol, 38 g of p-tert-amylphenol and 24 g of hexane were mixed with stirring until the mixture became homogeneous. Thereafter, to 93 g of this mixed solvent, 7 g of the polyaniline composite 1 obtained in Production Example 1 was added, and dissolved homogeneously. Further, to this solution, 0.59 g of 2-naphthalenesulfonic acid hydrate was added, dissolved homogenously, whereby a 7 mass % of polyaniline composite solution (conductive polymer solution) was prepared.

[Production and Evaluation of Conductive Polymer-Containing Porous Body]

Example 1-1

Figure 2:
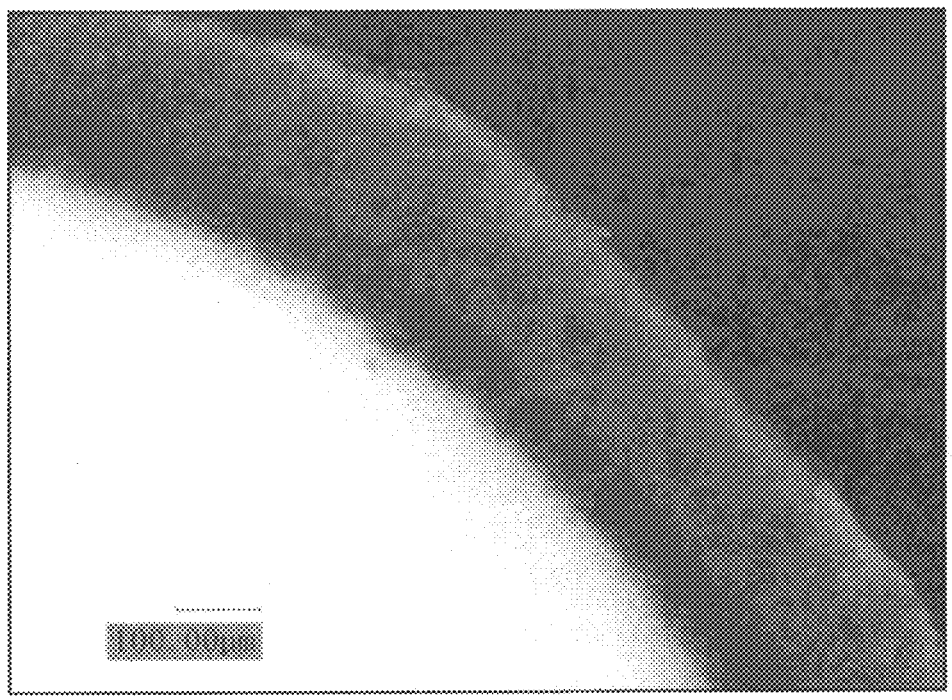
FIG. 2 is a microscopic photograph of a cross section of a conductive polymer-containing porous body obtained in Example 1-1.

4 g of boric acid was dissolved in 96 g of ion exchange water to prepare a 4 mass % aqueous boric acid solution. One alumina ball ("NKHO-24" manufactured by Sumitomo Chemical Co., Ltd.: porous body that has a diameter of 3 mm and is made of aluminum oxide) was immersed in 3 g of this boric acid aqueous solution for 5 minutes, followed by drying at 150° C. for 30 minutes. The alumina ball treated with the boric acid aqueous solution was immersed in 1 mass % of the polyaniline composite solution (the polyaniline composite solution obtained in Production Example 2) for 5 minutes, followed by drying at 150° C. for 30 minutes. The obtained alumina ball was cut with a nipper and the cross section thereof was observed. As a result, it was visually confirmed that even the inside of the alumina ball was colored by the polyaniline composite solution. A micrograph of the cross section of the alumina ball is shown in FIG. 2.

Examples 1-2 to 1-61

An alumina ball was treated in the same manner as in Example 1-1, except that those described in Tables 1-1 and 1-2 were used as the solution of an acid or a base, and the treated alumina ball was immersed in a polyaniline composite solution, and an evaluation was conducted. As a result, it was visually confirmed that even the inside of the alumina ball was colored by the polyaniline composite solution.

In Table 1, the "mixed solvent" is a solvent obtained by mixing ion exchange water and isopropyl alcohol at a mass ratio of 1:1. The "HEPES" means 2-[4-(2-hydroxyethyl)-1-piperazinyl]ethane sulfonic acid.

Comparative Example 1-1

The same procedures as those in Example 1-1 were conducted, except that a treatment with a solution of an acid or a salt was not conducted, and an evaluation was conducted.

As a result, it was revealed that the inside of the alumina ball was not colored with the polyaniline composite solution, and polyaniline adhered only to the surface thereof.

TABLE 1

| | | Solution of acid or salt | | |
|---|---|---|---|---|
| | | Solute | Solvent | Concentration (mass %) |
| Examples | 1-1 | Boric acid | Ion exchange water | 4 |
| | 1-2 | Boric acid | Ion exchange water | 1 |
| | 1-3 | Ammonium borate | Ion exchange water | 4 |
| | 1-4 | Ammonium borate | Ion exchange water | 1 |
| | 1-5 | Dodecylbenzene sulfonic acid | Ion exchange water | 4 |
| | 1-6 | Dodecylbenzene sulfonic acid | Ion exchange water | 2 |
| | 1-7 | Dodecylbenzene sulfonic acid | Ion exchange water | 1 |
| | 1-8 | Phosphoric acid | Ion exchange water | 1 |
| | 1-9 | Phosphoric acid | Ion exchange water | 4 |
| | 1-10 | Methyl(mono-, di-ester mixture) phosphate | Mixed solvent | 2 |
| | 1-11 | Methyl(mono-, di-ester mixture) phosphate | Mixed solvent | 4 |
| | 1-12 | Ethyl(mono-, di-ester mixture) phosphate | Mixed solvent | 2 |
| | 1-13 | Ethyl(mono, di-ester mixture) phosphate | Mixed solvent | 4 |
| | 1-14 | Isopropyl(mono-, di-ester mixture) phosphate | Mixed solvent | 2 |
| | 1-15 | Isopropyl(mono-, di-ester mixture) phosphate | Mixed solvent | 4 |
| | 1-16 | Butyl(mono, di-ester mixture) phosphate | Mixed solvent | 2 |
| | 1-17 | Butyl(mono, di-ester mixture) phosphate | Mixed solvent | 4 |
| | 1-18 | 2-Ethylhexyl(mono, di-ester mixture) phosphate | Mixed solvent | 1 |
| | 1-19 | 2-Ethylhexyl(mono, di-ester mixture) phosphate | Mixed solvent | 2 |
| | 1-20 | 2-Ethylhexyl(mono, di-ester mixture) phosphate | Mixed solvent | 4 |
| | 1-21 | Acetic acid | Ion exchange water | 2 |
| | 1-22 | Acetic acid | Ion exchange water | 4 |
| | 1-23 | Ammonium acetate | Ion exchange water | 2 |
| | 1-24 | Ammonium acetate | Ion exchange water | 4 |
| | 1-25 | Propionic acid | Mixed solvent | 2 |
| | 1-26 | Propionic acid | Mixed solvent | 4 |
| | 1-27 | DL-2-methylbutyric acid | Mixed solvent | 2 |
| | 1-28 | DL-2-methylbutyric acid | Mixed solvent | 4 |
| | 1-29 | 2-Ethylhexanoic acid | Mixed solvent | 1 |
| | 1-30 | 2-Ethylhexanoic acid | Mixed solvent | 2 |
| | 1-31 | 2-Ethylhaxanoic acid | Mixed solvent | 4 |
| | 1-32 | 3,5,5-Trimethylhexanoic acid | Mixed solvent | 2 |
| | 1-33 | 3,5,5-Trimethylhexanoic acid | Mixed solvent | 4 |
| | 1-34 | Myristic acid | Isopropyl alcohol | 2 |
| | 1-35 | Myristic acid | Isopropyl alcohol | 4 |
| | 1-36 | Adipic acid | Mixed solvent | 2 |
| | 1-37 | Adipic acid | Mixed solvent | 4 |
| | 1-38 | Diammonium adipate | Ion exhange water | 2 |

TABLE 1-continued

| | Solute | Solvent | Concentration (mass %) |
|---|---|---|---|
| 1-39 | Diammonium adipate | Ion exhange water | 4 |
| 1-40 | Glycine | Ion exhange water | 2 |
| 1-41 | Glycine | Ion exhange water | 4 |
| 1-42 | β alanine | Ion exhange water | 2 |
| 1-43 | β alanine | Ion exhange water | 4 |
| 1-44 | DL-alanine | Ion exhange water | 2 |
| 1-45 | DL-alanine | Ion exhange water | 4 |
| 1-46 | DL-valine | Ion exhange water | 2 |
| 1-47 | DL-valine | Ion exhange water | 4 |
| 1-48 | (±)-10-Camphorsulfonic acid | Ion exhange water | 2 |
| 1-49 | (±)-10-Camphorsulfonic acid | Ion exhange water | 4 |
| 1-50 | Dioctyl sulfosuccinate sodium | Ion exhange water | 2 |
| 1-51 | Dioctyl sulfosuccinate sodium | Ion exhange water | 4 |
| 1-52 | HEPES | Ion exhange water | 2 |
| 1-53 | HEPES | Ion exhange water | 4 |
| 1-54 | Monoammonium phosphate | Ion exhange water | 2 |
| 1-55 | Monoammonium phosphate | Ion exhange water | 4 |
| 1-56 | Diammonium phosphate | Ion exhange water | 2 |
| 1-57 | Diammonium phosphate | Ion exhange water | 4 |
| 1-58 | Butyric acid | Mixed solvent | 2 |
| 1-59 | Butyric acid | Mixed solvent | 4 |
| 1-60 | 2-Methylvaleric acid | Mixed solvent | 2 |
| 1-61 | 2-Methylvaleric acid | Mixed solvent | 4 |
| Comp. Ex. 1-1 | | — | |

[Production and Evaluation of Wound-Type Aluminum Solid Electrolytic Capacitor]

Example 2-1

1 g of boric acid was dissolved in 99 g of ion exchanged water to prepare a 1 mass % boric acid aqueous solution. A wound-type aluminum solid electrolytic capacitor was also prepared. The capacitor is a capacitor device obtained by winding an anode metal (anode body formed of a valve metal and its oxide) that is roughened and forms a dielectric film and a cathode electrode through a separator. In 5 g of a 1 mass % aqueous boric acid solution, one aluminum solid electrolytic capacitor (anodization voltage: 133V, separator: cellulose, theoretical capacity: 24.1 µF, diameter 5 mm×length 8 mm, manufactured by Japan Advanced Science and Technology, Inc.) was immersed for 1 minute, followed by drying at 150° C. for 30 minutes. Next, this device was immersed in the 10 mass % polyaniline composite solution prepared in Production Example 3 for 2 minutes, dried at 100° C. for 10 minutes, and then dried at 150° C. for 60 minutes.

For the obtained capacitor, by means of an LCR meter (Precision LCR Meter E4980A, manufactured by Agilent), Cap (electrostatic capacity) and tan δ (dielectric loss) at a frequency of 120 Hz and ESR (equivalent series resistance) at a frequency of 100 kHz were measured. The results are shown in Table 2.

Examples 2-2 to 2-13

Capacitors were prepared and evaluated in the same manner as in Example 2-1 except that the solution of an acid or a salt described in Table 2 was used instead of the 1 mass % aqueous boric acid solution. The results are shown in Table 2.

The solvent of the aqueous solution is ion exchange water. The "IPA" stands for isopropanol. The "%" indicates mass %.

Comparative Example 2-1

A capacitor was prepared and evaluated in the same manner as in Example 2-1, except that the treatment with a solution of an acid or a salt was not conducted. The results are shown in Table 2.

TABLE 2

| | Solution of acid or salt | Capacitor properties | | |
|---|---|---|---|---|
| | | Cap(µF) | tanδ | ESR(mΩ) |
| Example 2-1 | 1% Aqueous boric acid solution | 20.6 | 0.079 | 135.8 |
| Example 2-2 | 2% Aqueous boric acid solution | 21.2 | 0.033 | 85.4 |
| Example 2-3 | 4% Aqueous boric acid solution | 20.9 | 0.031 | 72.2 |
| Example 2-4 | 2% Aqueous ammonium borate solution | 21.3 | 0.167 | 131.8 |
| Example 2-5 | 4% Aqueous ammonium borate solution | 19.7 | 0.048 | 70.8 |
| Example 2-6 | 1% Aqueous sodium borate solution | 20.1 | 0.055 | 102.7 |
| Example 2-7 | 2% Aqueous sodium borate solution | 19.0 | 0.038 | 77.9 |
| Example 2-8 | 1% Aqueous potassium boric acid solution | 19.9 | 0.033 | 54.6 |
| Example 2-9 | 1% Aqueous lithium boric acid solution | 19.1 | 0.040 | 70.4 |
| Example 2-10 | 2% Aqueous lithium borate solution | 17.4 | 0.073 | 158.3 |
| Example 2-11 | 6% Phenylboric acid IPA solution | 19.1 | 0.107 | 209.5 |
| Example 2-12 | 8% Phenylboric acid IPA solution | 20.0 | 0.063 | 160.2 |
| Example 2-13 | 10% Phenylboric acid IPA solution | 19.1 | 0.061 | 138.0 |
| Comp. Ex. 2-1 | None | 17.2 | 0.159 | 442.1 |

Example 2-14

2 g of glycine was dissolved in 98 g of ion exchange water, and a 2 mass % aqueous glycine solution was prepared. In 5 g of the 2 mass % aqueous glycine solution, one aluminum solid electrolytic capacitor that is the same as that prepared in Example 2-1 was immersed for 5 minutes, followed by drying at 150° C. for 30 minutes. Subsequently, this device was immersed in a 7 mass % polyaniline composite solution prepared in Production Example 4 for 5 minutes, and dried at 60° C. for 30 minutes and then at 150° C. for 60 minutes. This immersion in a polyaniline composite solution and drying were further repeated twice.

For the obtained capacitor, an evaluation was conducted as in Example 2-1. The results are shown in Table 3.

Example 2-15

2 g of HEPES (2-[4-(2-hydroxyethyl)-1-piperazinyl]ethanesulfonic acid) was dissolved in 98 g of ion exchange water, whereby a 2 mass % aqueous HEPES solution was prepared. A capacitor was prepared and evaluated in the same manner as in Example 2-14, except that the 2 mass % aqueous HEPES solution was used instead of a 2 mass % aqueous glycine solution. The results are shown in Table 3.

Comparative Example 2-2

A capacitor was prepared and evaluated in the same manner as in Example 2-14, except that a treatment with a solution of an acid or a salt was not conducted. The results are shown in Table 3.

TABLE 3

| | | Capacitor properties | | |
| --- | --- | --- | --- | --- |
| | Solution of acid or salt | Cap(μF) | tanδ | ESR(mΩ) |
| Example 2-14 | 2% Aqueous glycine solution | 18.6 | 0.036 | 138 |
| Example 2-15 | 2% Aqueous HEPES solution | 17.8 | 0.113 | 248 |
| Comp. Ex. 2-2 | None | 9.1 | 0.51 | 3063 |

Example 2-16

4 g of boric acid was dissolved in a mixed solution of 86.4 g of ion exchange water and 9.6 g of isopropyl alcohol to prepare a 4 mass % boric acid solution. Further, a wound-type aluminum solid electrolytic capacitor was prepared. The capacitor is a capacitor device obtained by winding an anode metal (anode body formed of a valve metal and its oxide) that was surface-roughened and on which a dielectric film was formed and a cathode electrode through a separator. In 5 g of 4 mass % of an aqueous boric acid solution, one aluminum solid electrolytic capacitor (anodization voltage: 133V, separator: cellulose, theoretical capacity: 24.1 μF, diameterφ 5 mm×8 mm, manufactured by Japan Advanced Science and Technology, Inc.) was immersed for 5 minutes, followed by drying at 150° C. for 30 minutes. Next, this device was immersed in the 7 mass % polyaniline composite solution prepared in Production Example 4 for 5 minutes, dried at 60° C. for 30 minutes, and then dried at 150° C. for 60 minutes. This immersion in a polyaniline composite solution and drying were further repeated once.

For the obtained capacitor, an evaluation was conducted in the same manner as in Example 2-1. The results are shown in Table 4.

Example 2-17

2 g of boric acid was dissolved in a mixed solution of 88.2 g of ion exchange water and 9.8 g of isopropyl alcohol, whereby a 2 mass % boric acid solution was prepared. A capacitor was prepared and evaluated in the same manner as in Example 2-16, except that the 2 mass % boric acid solution was used instead of the 4 mass % boric acid solution. The results are shown in Table 4.

Example 2-18

2 g of 2-ethylhexanoic acid was dissolved in a mixed solution of 49 g of ion exchange water and 49 g of isopropyl alcohol, whereby a 2 mass % 2-ethylhexanoic acid solution was prepared. A capacitor was prepared and evaluated in the same manner as in Example 2-16, except that a 2 mass % 2-ethylhexanoic acid solution was used instead of the 4 mass % boric acid solution. The results are shown in Table 4.

Example 2-19

2 g of 2-ethylhexyl phosphate (mono-, di-ester mixture) was dissolved in a mixed solution of 49 g of ion exchange water and 49 g of isopropanol, whereby a 2 mass % 2-ethylhexyl phosphate (mono-, di-ester mixture) solution was prepared. A capacitor was prepared and evaluated in the same manner as in Example 2-16, except that a 2 mass % 2-ethylhexyl phosphate (mono-, di-ester mixture) solution was used instead of the 4 mass % boric acid solution. The results are shown in Table 4.

Example 2-20

4 g of 2-ethylhexyl phosphate (mono-, di-ester mixture) was dissolved in a mixed solution of 48 g of ion exchange water and 48 g of isopropanol, whereby a 4 mass % 2-ethylhexyl phosphate (mono-, di-ester mixture) solution was prepared. A capacitor was prepared and evaluated in the same manner as in Example 2-16, except that a 4 mass % 2-ethylhexanic phosphate (mono-, di-ester mixture) was used instead of the 4 mass % boric acid solution. The results are shown in Table 4.

Comparative Example 2-3

A capacitor was prepared and evaluated in the same manner as in Example 2-16, except that a treatment with a solution of an acid or a salt was not conducted. The results are shown in Table 4.

TABLE 4

| | | Capacitor properties | | |
| --- | --- | --- | --- | --- |
| | Solution of acid or salt | Cap(μF) | tanδ | ESR(mΩ) |
| Example 2-16 | 4% Boric acid solution | 18.9 | 0.022 | 84 |
| Example 2-17 | 2% Boric acid solution | 20.4 | 0.022 | 81 |
| Example 2-18 | 2% 2-Ethylhexanoic acid solution | 19.6 | 0.022 | 74 |
| Example 2-19 | 2% 2-Ethylhexyl (mono-, di-ester mixture) phosphate solution | 21.2 | 0.028 | 78 |
| Example 2-20 | 4% 2-Ethylhexyl (mono-, di-ester mixture) phosphate solution | 20.9 | 0.026 | 71 |
| Comp. Ex. 2-3 | None | 18.6 | 0.032 | 101 |

Example 2-21

2 g of glycine was dissolved in 98 g of ion exchange water, thereby to prepare a 2 mass % aqueous glycine solution. One aluminum solid electrolytic capacitor identical to that prepared in Example 2-1 was immersed in 5 g of the 2 mass % aqueous glycine solution for 5 minutes and dried at normal pressure and 110° C. for 30 minutes. Subsequently, this device was immersed in a 7 mass % polyaniline solution prepared in Production Example 4 for 5 minutes, and dried at 60° C. for 30 minutes and then at 150° C. for 60 minutes. This immersion in a polyaniline solution and drying were further repeated once.

For the obtained capacitor, an evaluation was conducted in the same manner as in Example 2-1. The results are shown in Table 5.

Examples 2 to 22 to 2 to 25

Capacitors were prepared and evaluated in the same manner as in Example 2-21, except that the drying temperature after immersion in the 2 mass % aqueous glycine solution was changed to those shown in Table 5. The results are shown in Table 5.

Example 2-26

4 g of boric acid was dissolved in 96 g of ion exchange water, and a 4 mass % aqueous boric acid solution was prepared. A capacitor was prepared and evaluated in the same manner as in Example 2-21, except that a 4 mass % aqueous boric acid solution was used instead of the 2 mass % aqueous glycine solution, and the drying temperature after immersion in the 4 mass % aqueous boric acid solution was 150° C. The results are shown in Table 5.

Examples 2-27 and 2-28

Capacitors were prepared in the same manner as in Example 2-26, except that the drying temperature after immersion in the 4 mass % aqueous boric acid solution was changed to those shown in Table 5. The results are shown in Table 5.

Comparative Example 2-4

A capacitor was prepared and evaluated in the same manner as in Example 2-21, except that immersion in the 2 mass % aqueous glycine solution and drying were not conducted. The results are shown in Table 5.

TABLE 5

| | Solution of acid or salt | Drying conditions after immersion in solution of acid or salt | Capacitor properties | | |
|---|---|---|---|---|---|
| | | | Cap(μF) | tanδ | ESR(mΩ) |
| Example 2-21 | 2% Aqueous glycine solution | 110° C., 30 min | 18.0 | 0.100 | 312 |
| Example 2-22 | 2% Aqueous glycine solution | 130° C., 30 min | 17.8 | 0.108 | 318 |
| Example 2-23 | 2% Aqueous glycine solution | 150° C., 30 min | 19.0 | 0.044 | 157 |
| Example 2-24 | 2% Aqueous glycine solution | 170° C., 30 min | 21.0 | 0.032 | 113 |
| Example 2-25 | 2% Aqueous glycine solution | 200° C., 30 min | 21.8 | 0.020 | 86 |
| Example 2-26 | 4% Aqueous boric acid solution | 150° C., 30 min | 20.7 | 0.034 | 107 |
| Example 2-27 | 4% Aqueous boric acid solution | 170° C., 30 min | 21.5 | 0.022 | 98 |
| Example 2-28 | 4% Aqueous boric acid solution | 200° C., 30 min | 22.0 | 0.028 | 130 |
| Comp. Ex. 2-4 | None | None | 16.2 | 0.208 | 1058 |

Example 2-29

2 g of glycine was dissolved in 98 g of ion exchange water, and a 2 mass % aqueous glycine solution was prepared. In 5 g of the 2 mass % glycine aqueous solution, one aluminum solid electrolytic capacitor that is the same as that prepared in Example 2-1 was immersed for 5 minutes, followed by drying at 110° C. for 30 minutes. Subsequently, this device was immersed in a 7 mass % polyaniline composite solution prepared in Production Example 4 for 5 minutes, and dried at 60° C. for 30 minutes and then at 150° C. for 60 minutes.

For the obtained capacitor, an evaluation was conducted in the same manner as in Example 2-1. The results are shown in Table 6.

Examples 2-30 to 2-33

Capacitors were prepared and evaluated in the same manner as in Example 2-29, except that the drying temperature after the immersion in the 2 mass % aqueous glycine solution was changed to that shown in Table 6. The results are shown in Table 6.

TABLE 6

| | Solution of acid or salt | Drying conditions after immersion in solution of acid or salt | Capacitor properties | | |
|---|---|---|---|---|---|
| | | | Cap(μF) | tanδ | ESR(mΩ) |
| Example 2-29 | 2% Aqueous glycine solution | 110° C., 30 min | 13.5 | 0.225 | 577 |
| Example 2-30 | 2% Aqueous glycine solution | 130° C., 30 min | 14.5 | 0.177 | 572 |
| Example 2-31 | 2% Aqueous glycine solution | 150° C., 30 min | 18.0 | 0.056 | 274 |
| Example 2-32 | 2% Aqueous glycine solution | 170° C., 30 min | 20.2 | 0.056 | 164 |
| Example 2-33 | 2% Aqueous glycine solution | 200° C., 30 min | 21.8 | 0.023 | 107 |

From Tables 2 to 6, it can be understood that the solid electrolytic capacitor obtained by the production method of the invention is excellent in electrostatic capacity and ESR. From Tables 5 and 6, it can be understood that, by increasing the temperature of drying after the immersion in a solution of an acid or a salt, the capacitor is excellent in capacitor characteristics, in particular, in electrostatic capacity. Further, from Table 6, by drying at a higher temperature after the treatment with a solution of an acid or a salt, a sufficiently excellent capacitor characteristics can be obtained even if the frequency of immersion in the conductive polymer solution is only once.

[Production and Evaluation of Conductive Polymer-Containing Porous Body Using Conductive Polymer Composition]

Example 3

(1) Production of Conductive Polymer Composition 38 g of isopropyl alcohol and 24 g of hexane were mixed (component (b)), 38 g of p-tert-amylphenol (component (e)) was added thereto, and mixed with stirring until it became homogeneous, whereby mixed solvent A was prepared.

1 g of polyaniline composite 1 (component (a)) and 1 g of 2-ethylhexanoic acid (component (c)) were added to 98 g of the mixed solvent A, and the polyaniline composite was homogeneously dissolved. Further, 0.084 g of 2-naphthalenesulfonic acid hydrate (component (d)) was added to this solution, and homogeneously dissolved, whereby a polyaniline composite solution (conductive polymer composition) having a content of the polyaniline composite of 1 mass % relative to the total of components (a) to (c) and (e) was obtained.

The solubility parameter (SP value) δ of 2-ethylhexanoic acid was calculated by the Fedors method described in "Polymer Engineering & Science", 1974, vol. 14, pp 147-154. Specifically, it was calculated by using the following formula (A):

$$\delta = \left( \sum_i \Delta e_i \bigg/ \sum_i \Delta v_i \right)^{1/2} \quad (A)$$

(wherein in the formula (A), $\Delta e_i$; represents the cohesive energy density of the functional group in the molecular structure, and $\Delta v_i$; represents the molecular volume)

From the formula (A), the SP value of 2-ethylhexanoic acid was 9.5 (cal/cm$^3$)$^{1/2}$. The SP value of 2-naphthalenesulfonic acid hydrate was calculated from the structure of 2-naphthalenesulfonic acid and was found to be 12.4 (cal/cm$^3$)$^{1/2}$. The value of $SO_3$ group was used for $\Delta e_i$ and $\Delta v_i$ of the sulfonic acid group portion at the time of SP value calculation.

(2) Production and Evaluation of Conductive Polymer-Containing Porous Body

An evaluation was conducted in the same manner as in Example 1-1, except that an alumina ball was immersed in 3 g of the above-mentioned conductive polymer composition instead of immersing the alumina ball in 3 g of an aqueous boric acid solution. As a result, it could be visually confirmed that the inside of the alumina ball was colored by polyaniline.

Examples 4 to 23 and Comparative Examples 3 and 4

Preparation of conductive polymer compositions, calculation of SP value and production and evaluation of conductive polymer-containing porous bodies were conducted in the same manner as in Example 3, except that the type and amount of the component (c) and the amount of other components were changed to those shown in Table 7. In Table 7, the "-" indicates that no components were added. The value of $PO_4$ group was used for $\Delta e_i$ and $\Delta v_i$ of the phosphate group part at the time of calculating SP value regardless of being a mono- or di-ester.

In Examples 4 to 23, it could be visually confirmed that the inside of the alumina ball was colored by polyaniline. In Comparative Examples 3 and 4, no coloring caused by the polyaniline composite was observed, and polyaniline adhered only to the surface.

Example 24

7 g of polyaniline composite 1 (component (a)) and 2 g of DL-2-methylbutyric acid (component (c)) were added to 91 g of the mixed solvent A and caused them to be homogeneously dissolved. Further, to this solution, 0.588 g of 2-naphthalenesulfonic acid hydrate (component (d)) was added, and caused it to be homogeneously dissolved, whereby a polyaniline composite solution (conductive polymer composition) having a content of the polyaniline composite of 7 mass % relative to the total of the components (a) to (c) and (e) was prepared.

By using the above-mentioned composition, in the same manner as in Example 3, production and evaluation of the conductive polymer-containing porous body were conducted. As a result, it could be visually confirmed that the inside of the alumina ball was colored by polyaniline.

Examples 25 and 26

Preparation of the conductive polymer composition and production and evaluation of the conductive polymer-containing porous body were conducted in the same manner as in Example 24, except that the amount of each component was changed to that shown in Table 7. In Examples 25 and 26, it could be visually confirmed that even the inside of the alumina ball was colored by polyaniline.

TABLE 7

| | Component (a) Polyanilline composite 1 (g) | Component (b) + (e) Mixed solvent A (g) | Component (c) | | | Component (d) 2-Naphthalenesulfonic acid hydrate (g) |
|---|---|---|---|---|---|---|
| | | | Compound | SP value (cal/cm$^3$)$^{1/2}$ | Amount (g) | |
| Example 3 | 1 | 98 | 2-Ethylhexanoic acid | 9.5 | 1 | 0.084 |
| Example 4 | 1 | 97 | 2-Ethylhexanoic acid | 9.5 | 2 | 0.084 |
| Example 5 | 1 | 95 | 2-Ethylhexanoic acid | 9.5 | 4 | 0.084 |
| Example 6 | 1 | 89 | 2-Ethylhexanoic acid | 9.5 | 10 | 0.084 |
| Example 7 | 1 | 97 | DL-2-Methylbutyric acid | 9.9 | 2 | 0.084 |
| Example 8 | 1 | 95 | DL-2-Methylbutyric acid | 9.9 | 4 | 0.084 |
| Example 9 | 1 | 93 | DL-2-Methylbutyric acid | 9.9 | 6 | 0.084 |
| Example 10 | 1 | 91 | DL-2-Methylbutyric acid | 9.9 | 8 | 0.084 |
| Example 11 | 1 | 89 | DL-2-Methylbutyric acid | 9.9 | 10 | 0.084 |
| Example 12 | 1 | 84 | DL-2-Methylbutyric acid | 9.9 | 15 | 0.084 |

TABLE 7-continued

| | Component (a) Polyanilline composite 1 (g) | Component (b) + (e) Mixed solvent A (g) | Component (c) | | | Component (d) 2-Naphthalenesulfonic acid hydrate (g) |
|---|---|---|---|---|---|---|
| | | | Compound | SP value (cal/cm$^3$)$^{1/2}$ | Amount (g) | |
| Example 13 | 1 | 69 | DL-2-Methylbutyric acid | 9.9 | 30 | 0.084 |
| Example 14 | 1 | 49 | DL-2-Methylbutyric acid | 9.9 | 50 | 0.084 |
| Example 15 | 1 | 29 | DL-2-Methylbutyric acid | 9.9 | 70 | 0.084 |
| Example 16 | 1 | 89 | Propionic acid | 10.7 | 10 | 0.084 |
| Example 17 | 1 | 89 | 2-Methylvaleic acid | 9.7 | 10 | 0.084 |
| Example 18 | 1 | 89 | 3,5,5-Trimethylhexanoic acid | 9.2 | 10 | 0.084 |
| Example 19 | 1 | 89 | Myristic acid | 9.3 | 10 | 0.084 |
| Example 20 | 1 | 89 | Ethyl (mono-, di-ester mixture) phosphate | Mono-ester 9.7 Di-ester 8.7 | 10 | 0.084 |
| Example 21 | 1 | 89 | Isopropyl (mono-, di-ester mixture) phosphate | Mono-ester 9.3 Di-ester 8.7 | 10 | 0.084 |
| Example 22 | 1 | 89 | Butyl (mono-, di-ester mixture) phosphate | Mono-ester 9.4 Di-ester 8.6 | 10 | 0.084 |
| Example 23 | 1 | 89 | 2-Ethylhexyl (mono-, di-ester mixture) phosphate | Mono-ester 9.0 Di-ester 8.4 | 10 | 0.084 |
| Example 24 | 7 | 91 | DL-2-Methylbutyric acid | 9.9 | 2 | 0.588 |
| Example 25 | 7 | 89 | DL-2-Methylbutyric acid | 9.9 | 4 | 0.588 |
| Example 26 | 7 | 83 | DL-2-Methylbutyric acid | 9.9 | 10 | 0.588 |
| Comp. Ex. 3 | 1 | 99 | — | | | — |
| Comp. Ex. 4 | 1 | 99 | — | | | 0.084 |

Example 27

36 g of 1-methoxy-2-propanol and 39 g of an isoparaffinic-based hydrocarbon composed of a component having 9 to 12 carbon atoms ("IP Solvent 1620" manufactured by Idemitsu Kosan Co., Ltd.) were mixed (component (b)). To this mixture, 25 g of p-tert-amylphenol (component (e)) was added and mixed with stirring until it became homogeneous, whereby mixed solvent B was prepared.

1 g of polyaniline composite 1 (component (a)) and 4 g of DL-2-methylbutyric acid (component (c)) were added to 95 g of mixed solvent B and caused them to be homogeneously dissolved. Further, 0.084 g of 2-naphthalenesulfonic acid hydrate (component (d)) was added to this solution, and caused it to be homogeneously dissolved, whereby a polyaniline composite solution (conductive polymer composition) having a content of the polyaniline composite of 1 mass % was prepared.

By using the above-mentioned composition, in the same manner as in Example 3, production and evaluation of the conductive polymer-containing porous body were conducted. As a result, it could be visually confirmed that even the inside of the alumina ball was colored by polyaniline.

Example 28 and Comparative Example 5

Preparation of the conductive polymer composition and production and evaluation of the conductive polymer-containing porous body were conducted in the same manner as in Example 27, except that the amount of each component was changed to those shown in Table 8. In Table 8, the "-" indicates that no components were added.

In Example 28, it could be visually confirmed that the inside of the alumina ball was colored by polyaniline. In Comparative Example 5, no coloring caused by the polyaniline composite was observed, and polyaniline adhered only to the surface.

TABLE 8

| | Component (a) Polyaniline composite 1 (g) | Component (b) + (e) Mixed solvent B (g) | Component (c) | | | Component (d) 2-Naphthalenesulfonic acid hydrate (g) |
|---|---|---|---|---|---|---|
| | | | Compound | SP value (cal/cm$^3$)$^{1/2}$ | Amount (g) | |
| Example 27 | 1 | 95 | DL-2-Methylbutyric acid | 9.9 | 4 | 0.084 |
| Example 28 | 1 | 89 | DL-2-Methylbutyric acid | 9.9 | 10 | 0.084 |
| Comp. Ex. 5 | 1 | 99 | — | | | 0.084 |

Example 29

37.1 g of 3-methoxy-1-butanol and 37.1 g of ethylene glycol mono-tert-butyl ether were mixed (component (b)). To this mixture, 19.8 g of p-tert-amylphenol (component (e)) was added and mixed with stirring until it became homogeneous, whereby mixed solvent C was prepared.

0.7 g of polyaniline composite 1 (component (a)) and 5 g of DL-2-methylbutyric acid (component (c)) were added to 94.0 g of mixed solvent C and caused them to be homogeneously dissolved. Further, 0.3 g of 2-naphthalenesulfonic acid hydrate (component (d)) was added to this solution, and caused it to be homogeneously dissolved, whereby a polyaniline composite solution (conductive polymer composition) having a content of the polyaniline composite of about 0.7 mass % relative to the total of the components (a) to (e) was prepared.

By using the above-mentioned composition, in the same manner as in Example 3, production and evaluation of the conductive polymer-containing porous body were conducted. As a result, it could be visually confirmed that even the inside of the alumna ball was colored by polyaniline.

Example 30

34.65 g of 3-methoxy-1-butanol and 34.65 g of ethylene glycol mono-tert-butyl ether were mixed (component (b)). To the mixture, 19.8 g of p-tert-amylphenol (component (e)) was added, mixed with stirring until it became homogeneous, whereby mixed solvent D was prepared.

0.7 g of polyaniline composite 1 (component (a)) and 9.9 g of DL-2-methylbutyric acid (component (c)) were added to 89.1 g of mixed solvent D and caused them to be homogeneously dissolved. Further, 0.3 g of 2-naphthalenesulfonic acid hydrate (component (d)) was added to this solution, and caused it to be homogeneously dissolved, whereby a polyaniline composite solution (conductive polymer composition) having a content of the polyaniline composite of about 0.7 mass % relative to the total of the components (a) to (e) was prepared.

By using the above-mentioned composition, in the same manner as in Example 3, production and evaluation of the conductive polymer-containing porous body were conducted. As a result, it could be visually confirmed that even the inside of the alumna ball was colored by polyaniline.

Example 31

32.15 g of 3-methoxy-1-butanol and 32.15 g of ethylene glycol mono-tert-butyl ether were mixed (component (b)). To the mixture, 19.8 g of p-tert-amylphenol (component (e)) was added, mixed with stirring until it became homogeneous, whereby mixed solvent E was prepared.

0.7 g of polyaniline composite 1 (component (a)) and 15 g of DL-2-methylbutyric acid (component (c)) were added to 84.1 g of mixed solvent E and caused them to be homogeneously dissolved. Further, 0.3 g of 2-naphthalenesulfonic acid hydrate (component (d)) was added to this solution, and caused it to be homogeneously dissolved, whereby a polyaniline composite solution (conductive polymer composition) having a content of the polyaniline composite of 0.7 mass % relative to the total of the components (a) to (e) was prepared.

By using the above-mentioned composition, in the same manner as in Example 3, production and evaluation of the conductive polymer-containing porous body were conducted. As a result, it could be visually confirmed that even the inside of the alumina ball was colored by polyaniline.

Comparative Example 6

40 g of 3-methoxy-1-butanol and 40 g of ethylene glycol mono-tert-butyl ether were mixed (component (b)). To the mixture, 20 g of p-tert-amylphenol (component (e)) was added, mixed with stirring until it became homogeneous, whereby mixed solvent F was prepared.

0.7 g of polyaniline composite 1 (component (a)) was added to 99.3 g of mixed solvent F and caused it be homogeneously dissolved. Further, 0.3 g of 2-naphthalenesulfonic acid hydrate (component (d)) was added to this solution, and caused it to be homogeneously dissolved, whereby a polyaniline composite solution (conductive polymer composition) having a content of the polyaniline composite of about 0.7 mass % relative to the total of the components (a) to (e) was prepared.

By using the above-mentioned composition, in the same manner as in Example 3, production and evaluation of the conductive polymer-containing porous body were conducted. As a result, it could be visually confirmed that even the inside of the alumna ball was colored by polyaniline composite.

TABLE 9

| | Component (a) Polyaniline composite 1 (g) | Component (b) + (e) Solvent (g) | Component (c) Compound | SP value $(cal/cm^3)^{1/2}$ | Amount (g) | Component (d) 2-Naphthalenesulfonic acid hydrate (g) |
|---|---|---|---|---|---|---|
| Example 29 | 0.7 | 94.0 (Mixed solvent C) | DL-2-Methylbutyric acid | 9.9 | 5.0 | 0.3 |
| Example 30 | 0.7 | 89.1 (Mixed solvent D) | DL-2-Methylbutyric acid | 9.9 | 9.9 | 0.3 |
| Example 31 | 0.7 | 84.1 (Mixed solvent E) | DL-2-Methylbutyric acid | 9.9 | 15.0 | 0.3 |
| Comp. Ex. 6 | 0.7 | 99.3 (Mixed solvent F) | — | | | 0.3 |

[Production and Evaluation of Conductive Polymer-Containing Porous Body Using Conductive Polymer Composition and Wound-Type Aluminum Solid Electrolytic Capacitor]

Example 32

(1) Production and Evaluation of Conductive Polymer-Containing Porous Body 7 g of polyaniline composite 1 (component (a)) and 2 g of DL-2-methylbutyric acid (component (c)) were added to 91 g of mixed solvent A and caused them to be homogeneously dissolved. Further, 0.59 g of 2-naphthalenesulfonic acid hydrate (component (d)) was added to this solution, and caused it to be homogeneously dissolved, whereby a polyaniline composite solution (conductive polymer composition) having a content of the polyaniline composite of 7 mass % relative to the total of the components (a) to (e) was prepared.

By using the above-mentioned composition, in the same manner as in Example 3, production and evaluation of the conductive polymer-containing porous body were conducted. As a result, it could be visually confirmed that even the inside of the alumna ball was colored by polyaniline.

(2) Production and Evaluation of Wound-Type Aluminum Solid Electrolytic Capacitor 4 g of boric acid was dissolved in 96 g of ion exchange water to prepare a 4 mass % boric acid aqueous solution. A wound-type aluminum solid electrolytic capacitor was also prepared. The capacitor is a capacitor device obtained by winding an anode metal (anode body formed of a valve metal and its oxide) that is roughened and on which a dielectric film is formed and a cathode electrode through a separator. In 5 g of the 4 mass % aqueous boric acid solution, one aluminum solid electrolytic capacitor (anodization voltage: 133V, separator: cellulose, theoretical capacity: 24.1 µF, diameter 5 mm×length 8 mm, manufactured by Japan Advanced Science and Technology, Inc.) was immersed for 5 minutes, followed by drying at 170° C. for 30 minutes. Next, this device was immersed in the above conductive polyaniline composition for 5 minutes, dried at 60° C. for 30 minutes, and then dried at 150° C. for 60 minutes.

For the obtained capacitor, by means of an LCR meter (Precision LCR Meter E4980A, manufactured by Agilent), Cap (electrostatic capacity) at a frequency of 120 Hz was measured. The results are shown in Table 10.

Examples 33 to 38

Preparation of the conductive polymer composition, production and evaluation of the conductive polymer-containing porous body and production and evaluation of a wound-type aluminum solid electrolytic capacitor were conducted in the same manner as in Example 32, except that the amount of each component was changed to those shown in Table 10. As a result, it could be visually confirmed that the inside of the alumna ball was colored by polyaniline in Examples 33 to 38. The results of evaluation of the obtained capacitor are shown in Table 10.

Comparative Example 7

Preparation of the conductive polymer composition, production and evaluation of the conductive polymer-containing porous body and production and evaluation of a wound-type aluminum solid electrolytic capacitor were conducted in the same manner as in Example 32, except that the amount of each component was changed to those shown in Table 10. No coloring caused by polyaniline composite was observed in the inside of the alumina ball, and polyaniline adhered only to the surface. The results of evaluation of the capacitor are shown in Table 10.

TABLE 10

| | Component (a) Polyaniline composite 1 (g) | Component (b) + (e) Solvent (g) | Component (c) Compound | SP value $(cal/cm^3)^{1/2}$ | Amount (g) | Component (d) 2-Naphthalenesulfonic acid hydrate (g) | Evaluation of capacitor Cap/µF |
|---|---|---|---|---|---|---|---|
| Example 32 | 7 | 91 | DL-2-Methylbutyric acid | 9.9 | 2.0 | 0.59 | 21.5 |
| Example 33 | 7 | 89 | DL-2-Methylbutyric acid | 9.9 | 4.0 | 0.59 | 21.8 |
| Example 34 | 7 | 84 | DL-2-Methylbutyric acid | 9.9 | 9.0 | 0.59 | 21.4 |
| Example 35 | 7 | 79 | DL-2-Methylbutyric acid | 9.9 | 14.0 | 0.59 | 22.3 |
| Example 36 | 7 | 89 | 3,5,5-Trimethylhexanonic acid | 9.2 | 4.0 | 0.59 | 22 |
| Example 37 | 7 | 84 | 3,5,5-Trimethylhexanonic acid | 9.2 | 9.0 | 0.59 | 22.2 |
| Example 38 | 7 | 79 | 3,5,5-Trimethylhexanonic acid | 9.2 | 14.0 | 0.59 | 22.2 |
| Comp. Ex. 7 | 7 | 93 | — | | | 0.59 | 20.6 |

From Table 10, it can be understood that the would-type aluminum solid electrolytic capacitor obtained from the conductive polymer composition of the invention is excellent in electrostatic capacity.

INDUSTRIAL APPLICABILITY

A solid electrolytic capacitor obtained by the production method of the invention can be used as a circuit device mounted in an electric and electronic circuit substrate, in particular, a circuit device mounted in an automobile, etc.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The specification of Japanese applications on the basis of which the present application claims Paris convention priority are incorporated herein by reference in its entirety.

The invention claimed is:

1. A conductive polymer composition comprising:
   (a) a conductive polymer which is a polyaniline composite comprising polyaniline and a proton donor, wherein the polyaniline is doped with the proton donor and the proton donor is diisooctyl sodium sulfosuccinate;
   (b) a solvent; and (c) an acid or a salt;

wherein component (c) comprises one or more acid or salt selected from the group consisting of: DL-2-methylbutyric acid; glycine and a salt thereof; β-alanine and a salt thereof; DL-alanine and a salt thereof; DL-valine and a salt thereof; boric acid; a boric acid salt; phenylboronic acid; a phenylboronic acid salt; and mixtures thereof.

2. The conductive polymer composition according to claim 1, wherein the content of the acid or salt (c) is 1.0 to 70 mass % relative to the total of the conductive polymer composition.

3. The conductive polymer composition according to claim 1, which further comprises a heat-resistance stabilizer (d), which is different from the acid or salt (c).

4. The conductive polymer composition according to claim 3, wherein the heat-resistance stabilizer (d) is 2-naphthalenesulfonic acid.

5. The conductive polymer composition according to claim 1, which further comprises a phenolic compound (e).

6. A method for producing a conductive polymer-containing porous body comprising the steps of:
   a) contacting a porous body having an oxide of a valve metal with a solution of an acid or a salt; and
   b) impregnating the porous body with a conductive polymer composition according to claim 1 simultaneously with or after the contact step a).

7. The method for producing a conductive polymer-containing porous body according to claim 6, wherein the concentration of the solution of the acid or the salt in step a) is 1.0 to 15.0 mass %.

8. The method for producing a conductive polymer-containing porous body according to claim 6, wherein the acid or the salt in step a) is one or more selected from the group consisting of sulfonic acid and a salt thereof, phosphoric acid and a salt thereof, a phosphoric acid ester and a salt thereof, carboxylic acid and a salt thereof, amino acid and a salt thereof, boric acid and a salt thereof, and boronic acid and a salt thereof.

9. The method for producing a conductive polymer-containing porous body according to claim 6, wherein steps a) and b) are conducted simultaneously.

10. A method for producing a solid electrolytic capacitor comprising the steps of:
    a) contacting an anode body that is a porous body composed of a valve metal and has a surface formed of an oxide of a valve metal with a solution of an acid or a salt; and
    b) forming a solid electrolyte layer formed of a conductive polymer on the anode body by impregnating the anode body with a conductive polymer composition according to claim 1, simultaneously with or after the contact step a), followed by drying.

11. The method for producing a solid electrolytic capacitor according to claim 10, wherein the concentration of the solution of the acid or the salt in step a) is 1.0 to 15.0 mass %.

12. The method for producing a solid electrolytic capacitor according to claim 10, wherein the acid or the salt in step a) is one or more selected from the group consisting of sulfonic acid and a salt thereof, phosphoric acid and a salt thereof, a phosphoric acid ester and a salt thereof, carboxylic acid and a salt thereof, amino acid and a salt thereof, boric acid and a salt thereof, and boronic acid and a salt thereof.

13. The method for producing a solid electrolytic capacitor according to claim 10, wherein steps a) and b) are conducted simultaneously.

* * * * *